US012574097B2

(12) United States Patent
Kim et al.

(10) Patent No.: US 12,574,097 B2
(45) Date of Patent: Mar. 10, 2026

(54) METHOD FOR OPERATING DEVICE IN WIRELESS COMMUNICATION SYSTEM, AND DEVICE

(71) Applicant: LG Electronics Inc., Seoul (KR)

(72) Inventors: Sunam Kim, Seoul (KR); Dongsun Lee, Seoul (KR); Byounggill Kim, Seoul (KR); Jongku Lee, Seoul (KR); Hyunmin Kim, Seoul (KR); Taehowan Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 18/703,602

(22) PCT Filed: Oct. 22, 2021

(86) PCT No.: PCT/KR2021/014910
§ 371 (c)(1),
(2) Date: Apr. 22, 2024

(87) PCT Pub. No.: WO2023/068410
PCT Pub. Date: Apr. 27, 2023

(65) Prior Publication Data
US 2024/0413880 A1     Dec. 12, 2024

(51) Int. Cl.
*H04B 7/02* (2018.01)
*H04B 7/06* (2006.01)

(52) U.S. Cl.
CPC ............................... *H04B 7/06966* (2023.05)

(58) Field of Classification Search
CPC .................................................. H04B 7/06966
USPC ................ 375/267, 260, 259, 219, 295, 316
See application file for complete search history.

(56) References Cited

U.S. PATENT DOCUMENTS

| | | | |
|---|---|---|---|
| 6,684,071 B1 | 1/2004 | Molnar et al. | |
| 2009/0023462 A1 | 1/2009 | Dent | |
| 2011/0248887 A1 | 10/2011 | Whelan et al. | |
| 2014/0323143 A1* | 10/2014 | Jung .................... | H04B 7/0617 |
| | | | 455/562.1 |

(Continued)

FOREIGN PATENT DOCUMENTS

CN          112311445 A          2/2021

OTHER PUBLICATIONS

International Search Report and Written Opinion in International Appln. No. PCT/KR2021/014910, mailed on Jul. 14, 2022, 17 pages (with English translation).

*Primary Examiner* — Zewdu A Kassa
(74) *Attorney, Agent, or Firm* — Fish & Richardson P.C.

(57) ABSTRACT

A method for operating a device in a wireless communication system, and a device using the method. The method: receives configuration information with respect to a first beam and a second beam from a transmitter; generates beam mismatch information by measuring the first beam and the second beam, on the basis of the configuration information; and transmits the beam mismatch information to the transmitter, wherein the first beam and the second beam satisfy a predetermined condition, and the beam mismatch information indicates a degree of mismatch of the first beam relative to the matching position of the first beam, on the basis of the first reception intensity and the first phase value of the first beam and the second reception intensity and the second phase value of the second beam.

13 Claims, 20 Drawing Sheets

Receiving configuration information for a first beam and a second beam which satisfy predetermined conditions from a transmitter ~ S1610

Based on the configuration information, measuring the first beam and the second beam and generating beam mismatch information
The beam mismatch information is information indicating the degree of mismatch of the first beam based on the matching position of the first beam based on the first received intensity (magnitude) and first phase value of the first beam and the second received intensity (magnitude) and second phase value of the second beam ~ S1620

Transmitting the beam mismatch information (and/or beam switching information based on the beam mismatch information) to the transmitter ~ S1630

(56) References Cited

U.S. PATENT DOCUMENTS

| | | |
|---|---|---|
| 2019/0123809 A1 | 4/2019 | Oza et al. |
| 2021/0258061 A1* | 8/2021 | Harrebek ............. H04B 7/0404 |

* cited by examiner

FIG. 3

FIG. 5
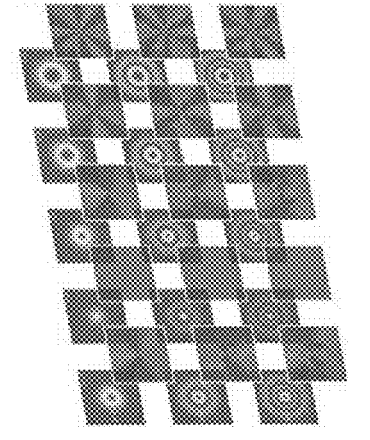
(b) LG mode
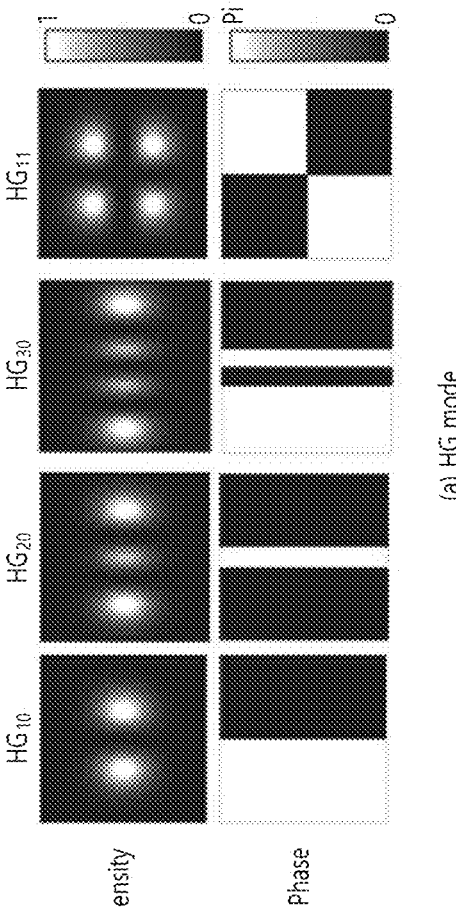
(a) HG mode

Phase Plate

AUT(antenna under test)
extention

SGH(standard gain horn)
antenna

Measurement setup

FIG. 10
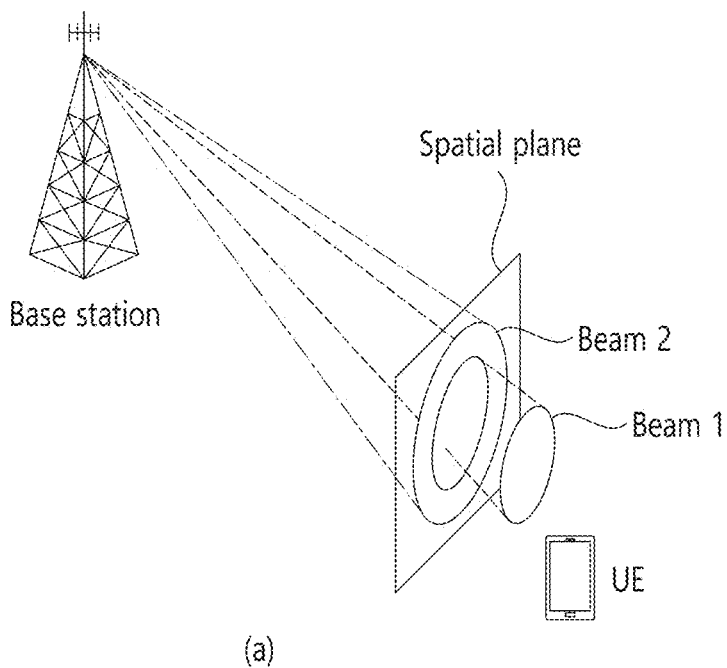
(a)
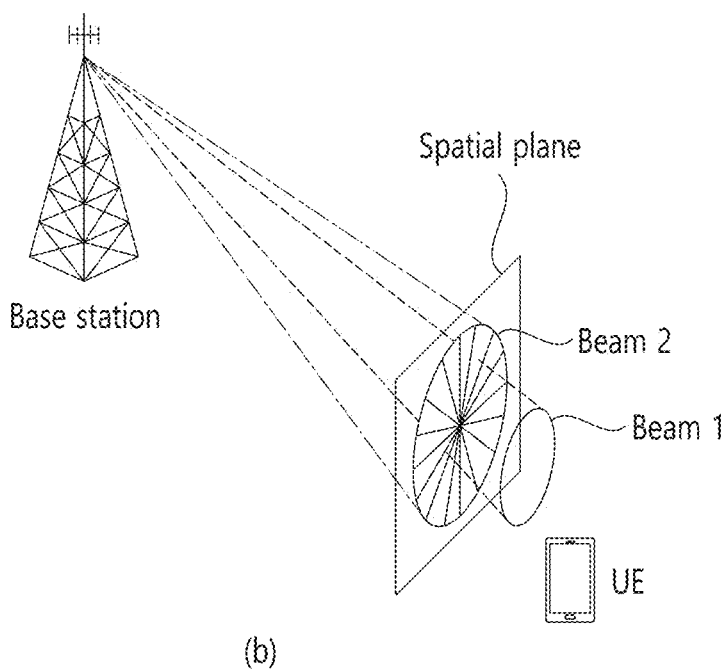
(b)

Figure 16:
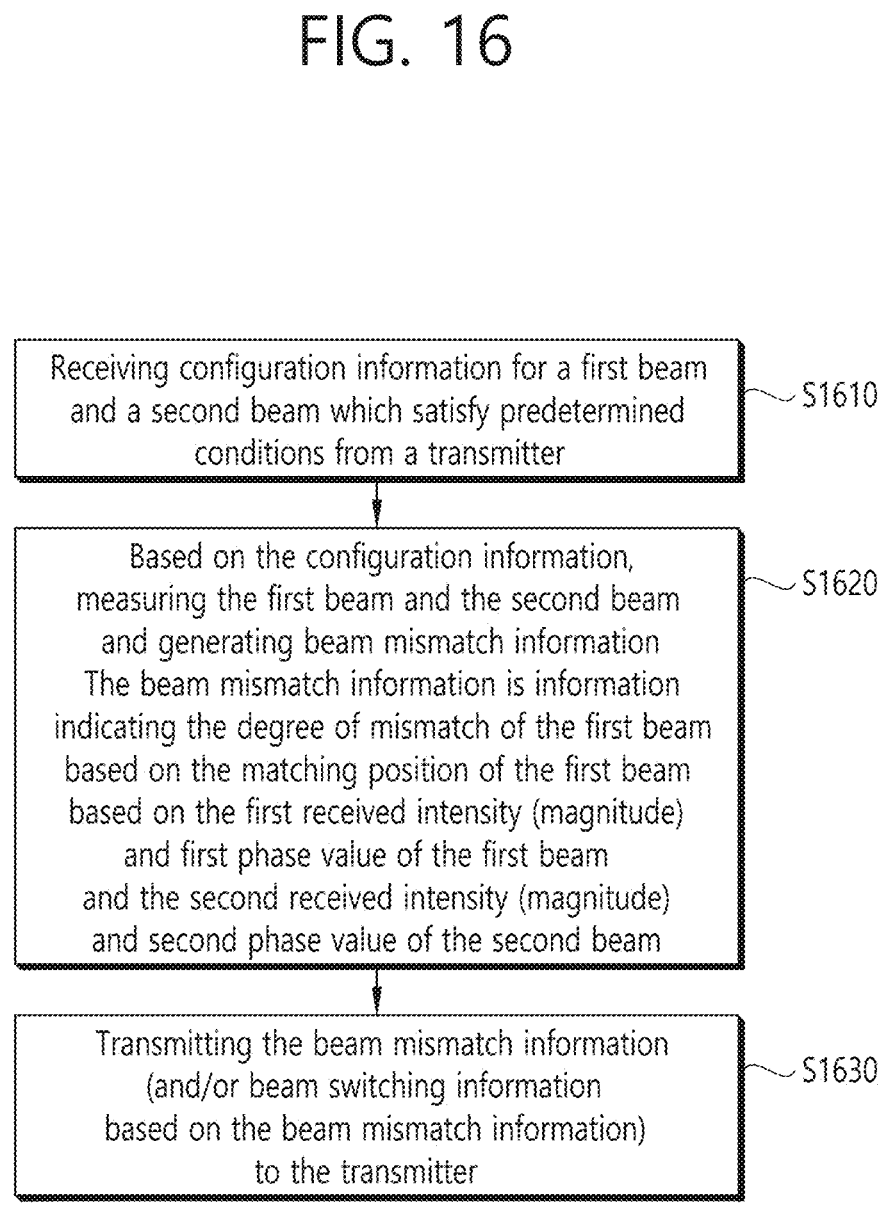

Receiving configuration information for a first beam
and a second beam which satisfy predetermined
conditions from a transmitter                          ~ S1610

Based on the configuration information,
measuring the first beam and the second beam
and generating beam mismatch information           ~ S1620
The beam mismatch information is information
indicating the degree of mismatch of the first beam
based on the matching position of the first beam
based on the first received intensity (magnitude)
and first phase value of the first beam
and the second received intensity (magnitude)
and second phase value of the second beam Transmitting the beam mismatch information
(and/or beam switching information              ~ S1630
based on the beam mismatch information)
to the transmitter

METHOD FOR OPERATING DEVICE IN WIRELESS COMMUNICATION SYSTEM, AND DEVICE

CROSS-REFERENCE TO RELATED APPLICATIONS

This application is a National Stage application under 35 U.S.C. § 371 of International Application No. PCT/KR2021/014910, filed on Oct. 22, 2021. The disclosure of the prior application is incorporated by reference herein in its entirety.

TECHNICAL FIELD

This specification relates to beam-related operations of devices in wireless communication systems.

BACKGROUND 5G (generation) NR (new radio) may use mmWave (millimeter wave). mmWave uses multiple antennas to overcome path loss. In order to solve the problem of using complex radio frequency (RF) structures, hybrid beamforming is adopted in 5G NR. Hybrid beamforming is a mixture of analog beamforming using a phase shifter at the RF end and digital multi-input multi-output (MIMO) signal processing in the baseband. In particular, it aims to overcome path loss by maximizing the gain from analog beamforming. At this time, the beam matching process of the transmitting and receiving ends by analog beamforming becomes the key to smooth communication.

In 5G NR, the process of beam matching is that the base station transmits (shows) multiple transmission beams, and the user equipment (UE) finds the preferred transmission beam by feedbacking the measured beam strength. The base station then periodically sends the found transmission beam, and the UE changes the reception beam to find the optimal reception beam for the UE. Here, the reception beam may refer to configurations/spatial parameters/filters for receiving signals, etc.

However, future wireless communication systems such as 6G may use higher frequency bands such as THz (terahertz). As the communication frequency band increases, the path loss becomes larger, and to overcome this, it is expected that more antennas will need to be used to operate more beams with narrower beamwidths. In this case, using the same process for beam matching as in the past can lead to significant time delays and operational difficulties.

SUMMARY

The object is to provide a method of operating a device related to beam operation in a wireless communication system and a device that uses the method.

In one aspect, provided is a method of operating a receiver in a wireless communication system. The method includes receiving, from a transmitter, configuration information for a first beam and a second beam, measuring the first beam and the second beam to generate beam mismatch information based on the configuration information, and transmitting the beam mismatch information to the transmitter. The first beam and the second beam are beams satisfying predetermined conditions, the beam mismatch information informing a degree of mismatch of the first beam relative to a matching position of the first beam based on a first received intensity and a first phase value of the first beam and a second received intensity and a second phase value of the second beam.

In another aspect, provided is a receiver. The receiver includes a transceiver, at least one memory and at least one processor operably coupled to the at least one memory and the transceiver. The processor is adapted to: receive, from a transmitter, configuration information for a first beam and a second beam, measure the first beam and the second beam to generate beam mismatch information based on the configuration information and transmit the beam mismatch information to the transmitter. The first beam and the second beam are beams satisfying predetermined conditions, the beam mismatch information informing a degree of mismatch of the first beam relative to a matching position of the first beam based on a first received intensity and a first phase value of the first beam and a second received intensity and a second phase value of the second beam.

In still another aspect, provided is an apparatus included in a receiver. The apparatus includes at least one memory and at least one processor operably coupled to the at least one memory. The processor is adapted to: receive, from a transmitter, configuration information for a first beam and a second beam, measure the first beam and the second beam to generate beam mismatch information based on the configuration information and transmit the beam mismatch information to the transmitter. The first beam and the second beam are beams satisfying predetermined conditions, the beam mismatch information informing a degree of mismatch of the first beam relative to a matching position of the first beam based on a first received intensity and a first phase value of the first beam and a second received intensity and a second phase value of the second beam.

In still another aspect, provided is a computer readable medium (CRM) storing instructions that cause an operation to be executed by at least one processor. The operation includes receiving, from a transmitter, configuration information for a first beam and a second beam, measuring the first beam and the second beam to generate beam mismatch information based on the configuration information and transmitting the beam mismatch information to the transmitter. The first beam and the second beam are beams satisfying predetermined conditions, the beam mismatch information informing a degree of mismatch of the first beam relative to a matching position of the first beam based on a first received intensity and a first phase value of the first beam and a second received intensity and a second phase value of the second beam.

In still another aspect, provided is a method of operating a transmitter in a wireless communication system. The method includes transmitting, to a receiver, configuration information for a first beam and a second beam and receiving at least one of beam mismatch information generated by measuring the first beam and the second beam and beam switching information based on the beam mismatch information from the receiver. The first beam and the second beam are beams satisfying predetermined conditions, the beam mismatch information informing a degree of mismatch of the first beam relative to a matching position of the first beam based on a first received intensity and a first phase value of the first beam and a second received intensity and a second phase value of the second beam.

In still another aspect, provided is a transmitter including a transceiver, at least one memory, and at least one processor operably coupled to the at least one memory and the transceiver. The processor is adapted to: transmit, to a receiver, configuration information for a first beam and a second beam and receive at least one of beam mismatch information generated by measuring the first beam and the second beam and beam switching information based on the beam mismatch information from the receiver. The first beam and the second beam are beams satisfying predetermined conditions, the beam mismatch information informing a degree of mismatch of the first beam relative to a matching position of the first beam based on a first received intensity and a first phase value of the first beam and a second received intensity and a second phase value of the second beam.

In the beam matching method, instead of showing all possible beam candidates and selecting the optimal beam from among them, a very small number of beams (e.g., two) compared to the above beam candidates can be utilized to obtain information about the mismatch of the beam direction of the transmitter and the receiver, and to track the direction of movement of the receiver or select the optimal beam based on the information. Thus, even in wireless communication systems that are expected to operate a very large number of beams, such as 6G, the beam matching process can be performed with minimal time delay. As a result, communication efficiency can be increased and the complexity of beam operation can be reduced. Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 3 illustrates an example of a communication structure that may be provided in a 6G system.

FIG. 5 illustrates the intensity and phase of signals generated in HG mode or LG mode.

FIG. 10 illustrates the concept of the beam consistency measurement method proposed in this disclosure.

FIG. 16 illustrates a method of operating a receiver in a wireless communication system.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

Technical features described individually in one drawing in this specification may be implemented individually or simultaneously.

Hereinafter, a new radio access technology (new RAT, NR) will be described.

As more communication devices require greater communication capacity, there is a need for improved mobile broadband communication compared to existing radio access technology (RAT). Additionally, Massive Machine Type Communications (MTC), which provides various services anytime, anywhere by connecting multiple devices and objects, is also one of the major issues to be considered in next-generation communications. Furthermore, the design of communication systems considering reliability and latency sensitive services/UEs is being discussed. As such, the introduction of next-generation wireless access technologies considering enhanced mobile broadband communication, massive MTC, ultra-reliable and low latency communication (URLLC), etc. is being discussed, and the technology is referred to herein as new RAT or NR for convenience.

Figure 1:
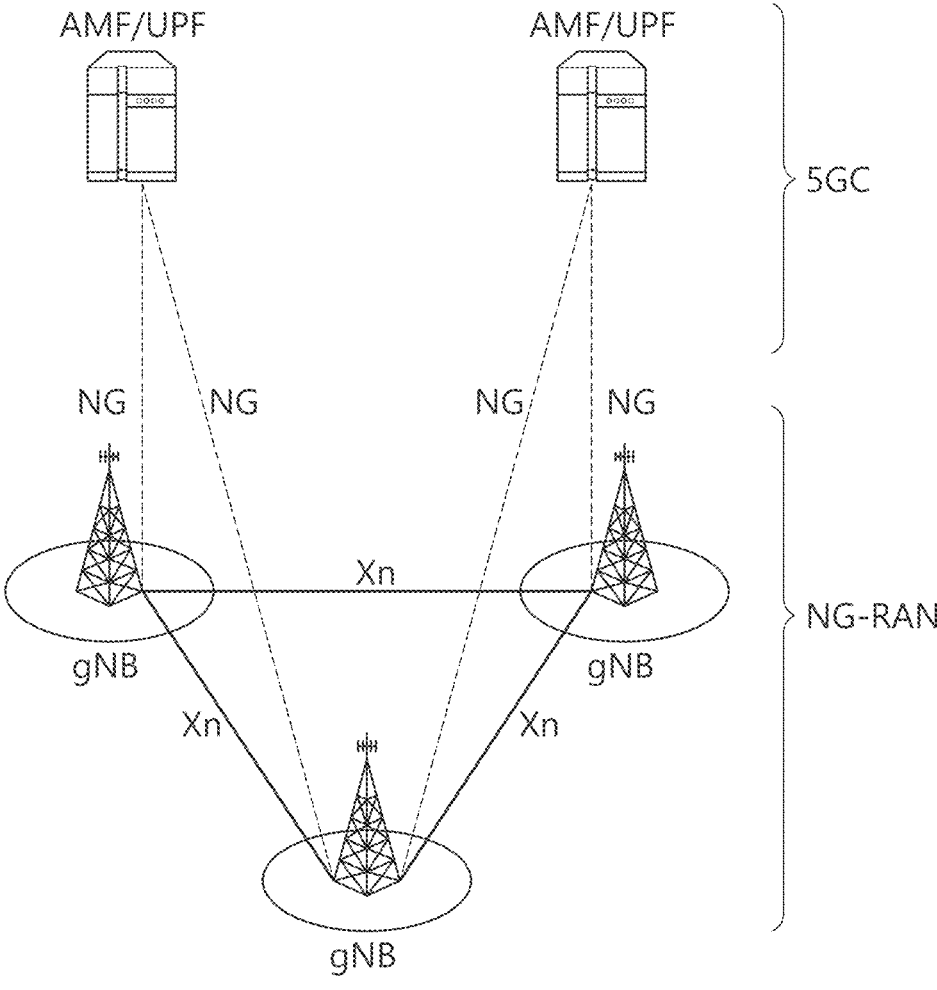
FIG. 1 illustrates the system structure of a New Generation Radio Access Network (NG-RAN) with NR.

FIG. 1 illustrates the system structure of a radio access network (New Generation Radio Access Network: NG-RAN) to which NR is applied.

Referring to FIG. 1, an NG-RAN may include gNBs and/or eNBs that provide user plane and control plane protocol termination to UEs. FIG. 1 illustrates the case of including only gNBs. The gNBs and eNBs are connected to each other by Xn interfaces. The gNBs and eNBs are connected to the 5G Core Network (5GC) via NG interfaces. More specifically, the access and mobility management function (AMF) is connected via the NG-C interface, and the user plane function (UPF) is connected via the NG-U interface.

NR supports multiple numerologies or subcarrier spacing (SCS) to support various 5G services. For example, if SCS is 15 kHz, it supports a wide area in traditional cellular bands, and if SCS is 30 kHz/60 kHz, it supports dense-urban, lower latency, and wider areas. It supports a wider carrier bandwidth, and when SCS is 60 kHz or higher, it supports a bandwidth greater than 24.25 GHz to overcome phase noise.

The NR frequency band can be defined as two types of frequency ranges (FR1, FR2). The values of the frequency range may vary. For example, the frequency ranges of the two types (FR1, FR2) may be as shown in Table 1 below. For convenience of explanation, among the frequency ranges used in the NR system, FR1 may mean "sub 6 GHz range" and FR2 may mean "above 6 GHz range" and may be referred to as MilliMeter Wave (mmW).

TABLE 1

| Frequency range designation | Frequency range | Subcarrier spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of 6 GHz (or 5850, 5900, 5925 MHz, etc.). For example, the frequency band above 6 GHz (or 5850, 5900, 5925 MHz, etc.) included within FR1 may include an unlicensed band. Unlicensed bands can be used for a variety of purposes, for example for communications for vehicles (e.g. autonomous driving).

TABLE 2

| Frequency range designation | Frequency range | Subcarrier spacing |
|---|---|---|
| FR1 | 410 MHz-7125 MHz | 15, 30, 60 KHz |
| FR2 | 24250 MHz-52600 MHz | 60, 120, 240 KHz |

Here, wireless communication technologies implemented in the wireless device of this specification may include NarrowBand IoT (NB-IoT) for low-power communication as well as LTE, NR, and 6G. For example, NB-IoT technology may be an example of LPWAN (Low Power Wide Area Network) technology and may be implemented in standards such as LTE Cat NB1 and/or LTE Cat NB2, and is not limited to the above-mentioned names. Additionally or alternatively, the wireless communication technology implemented in the wireless device of the present specification may perform communication based on LTE-M technology. For example, LTE-M technology may be an example of LPWAN technology and may be called various names such as enhanced MTC (eMTC). For example, LTE-M technology may be implemented in at least one of a variety of specifications, including 1) LTE CAT 0, 2) LTE Cat M1, 3) LTE Cat M2, 4) LTE non-Bandwidth Limited (non-BL), 5)

LTE-MTC, 6) LTE MTC, and/or 7) LTE M, and is not limited to the above designations. Additionally or alternatively, the wireless communication technologies implemented in the wireless devices of the present disclosure may include at least one of ZigBee, Bluetooth, and/or LPWAN with consideration for low power communication, and are not limited to the above designations. For example, Zigbee technology can create Personal Area Networks (PANs) for small/low-power digital communications based on various specifications such as IEEE 802.15.4, which can go by many names.

Figure 2:
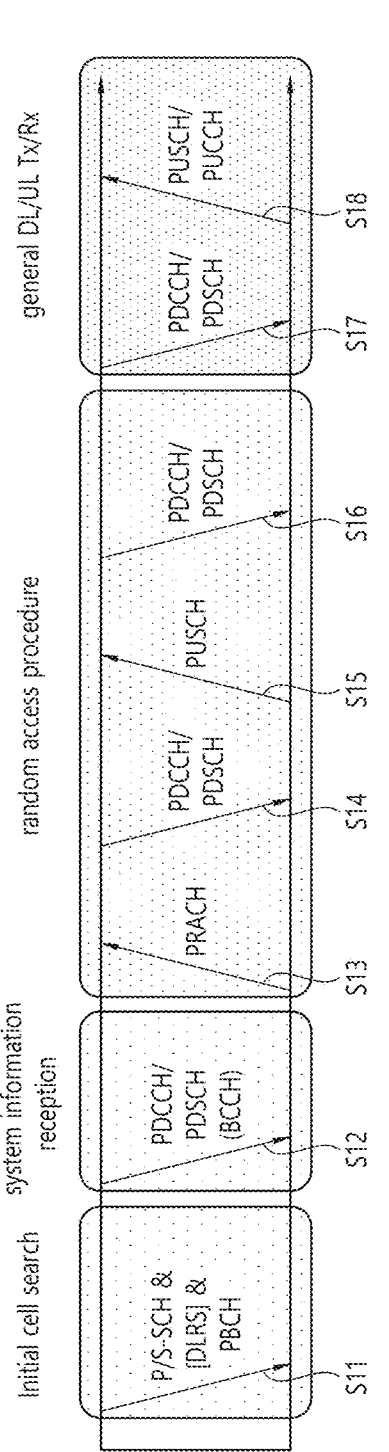
FIG. 2 illustrates the physical channels utilized in a 3GPP system and typical signal transmission.

FIG. 2 illustrates physical channels and typical signal transmission used in a 3GPP system. In a wireless communication system, a UE receives information from a base station through downlink (DL), and the UE transmits information to the base station through uplink (UL). The information transmitted and received between the base station and the UE includes data and various control information, and various physical channels exist depending on the type/purpose of the information they transmit and receive.

The UE which is powered on or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Meanwhile, if there are no radio resources to connect to the base station for the first time or to transmit a signal, the UE may perform a random access procedure (RACH, which may also be referred to as a random access process) to the base station (S13 to S16). To do this, the UE may transmit a specific sequence as a preamble over the Physical Random Access Channel (PRACH) (S13 and S15) and receive a response message (Random Access Response (RAR) message) to the preamble over the PDCCH and the corresponding PDSCH. In the case of contention-based RACH, an additional conflict resolution procedure can be performed (S16).

After performing the procedure described above, the UE can then perform PDCCH/PDSCH reception (S17) and Physical Uplink Shared Channel (PUSCH)/Physical Uplink Control Channel (PUCCH) transmission (S18) as a normal uplink signal transmission procedure. In particular, the UE may receive downlink control information (DCI) via PDCCH. The DCI includes control information, such as resource allocation information for the UE, and may be formatted differently depending on the intended use.

On the other hand, the control information transmitted by the UE to the base station via the uplink or received by the UE from the base station may include downlink/uplink ACK/NACK signals, channel quality indicators (CQI), pre-coding matrix indices (PMI), rank indicators (RI), etc. The UE may transmit control information such as CQI/PMI/RI described above via PUSCH and/or PUCCH.

<Structure of Uplink and Downlink Channels>

1. Downlink Channel Structure

The base station transmits related signals to the UE through a downlink channel described later, and the UE receives related signals from the base station through a downlink channel described later.

(1) Physical Downlink Shared Channel (PDSCH)

PDSCH carries downlink data (e.g., DL-shared channel transport block, DL-SCH TB) and is subject to modulation methods such as Quadrature Phase Shift Keying (QPSK), 16 Quadrature Amplitude Modulation (QAM), 64 QAM, 256 QAM, etc. A codeword is generated by encoding TB. PDSCH can carry multiple codewords. Each codeword is scrambled and modulation mapped, and the modulation symbols generated from each codeword are mapped to one or more layers (Layer mapping). Each layer is mapped to resources along with DMRS (Demodulation Reference Signal), generated as an OFDM symbol signal, and transmitted through the corresponding antenna port.

(2) Physical Downlink Control Channel (PDCCH)

PDCCH carries downlink control information (DCI) and QPSK modulation method is applied. One PDCCH consists of 1, 2, 4, 8, or 16 CCEs (Control Channel Elements) depending on the AL (Aggregation Level). One CCE consists of six REGs (Resource Element Group). One REG is defined by one OFDM symbol and one (P)RB.

The UE obtains DCI transmitted through the PDCCH by performing decoding (aka blind decoding) on a set of PDCCH candidates. The set of PDCCH candidates that the UE decodes is defined as the PDCCH search space set. The search space set may be a common search space or a UE-specific search space. The UE can obtain DCI by monitoring PDCCH candidates within one or more search space sets set by MIB or higher layer signaling.

2. Uplink Channel Structure

The UE transmits the relevant signals to the base station via the uplink channel described above, and the base station receives the relevant signals from the UE via the uplink channel described above.

(1) Physical Uplink Shared Channel (PUSCH)

PUSCH carries uplink data (e.g., UL-shared channel transport block, UL-SCH TB) and/or uplink control information (UCI) and is transmitted based on a CP-OFDM (Cyclic Prefix-Orthogonal Frequency Division Multiplexing) waveform, DFT-s-OFDM (Discrete Fourier Transform-spread-Orthogonal Frequency Division Multiplexing) waveform, etc. When the PUSCH is transmitted based on the DFT-s-OFDM waveform, the UE transmits the PUSCH by applying transform precoding. For example, when transform precoding is not possible (e.g., transform precoding is disabled), the UE may transmit PUSCH based on the CP-OFDM waveform, and when transform precoding is possible (e.g., transform precoding is enabled), the UE may transmit PUSCH based on the CP-OFDM waveform or the DFT-s-OFDM waveform. PUSCH transmissions can be dynamically scheduled by UL grants within the DCI, or semi-statically scheduled based on higher layer (e.g., RRC) signaling (and/or Layer 1 (L1) signaling (e.g., PDCCH)) (configured grant). PUSCH transmission can be performed based on codebook or non-codebook.

(2) Physical Uplink Control Channel (PUCCH)

A PUCCH carries uplink control information, HARQ-ACKs and/or scheduling requests (SRs) and may be divided into multiple PUCCHs based on the length of the PUCCH transmission.

<6G System General>

The 6G (wireless communication) system is aimed at (i) very high data rates per device, (ii) a very large number of connected devices, (iii) global connectivity, (iv) very low latency, (v) lower energy consumption for battery-free IoT devices, (vi) ultra-reliable connectivity, and (vii) connected intelligence with machine learning capabilities. The vision of the 6G system can be four aspects, such as intelligent connectivity, deep connectivity, holographic connectivity, and ubiquitous connectivity, and the 6G system can satisfy the requirements as shown in Table 3 below. In other words, Table 3 is an example of the requirements of the 6G system.

TABLE 3

| Per device peak data rate | 1 Tbps |
|---|---|
| E2E latency | 1 ms |
| Maximum spectral efficiency | 100 bps/Hz |
| Mobility support | Up to 1000 km/hr |
| Satellite integration | Fully |
| Artificial intelligence (AI) | Fully |
| Autonomous vehicle | Fully |
| Extended Reality (XR) | Fully |
| Haptic Communication | Fully |

6G systems may have key factors such as enhanced mobile broadband (eMBB), ultra-reliable low latency communications (URLLC), massive machine-type communication: (mMTC), AI integrated communication, tactile internet, high throughput, high network capacity, high energy efficiency, low backhaul and access network congestion, and enhanced data security.

Figure 3:
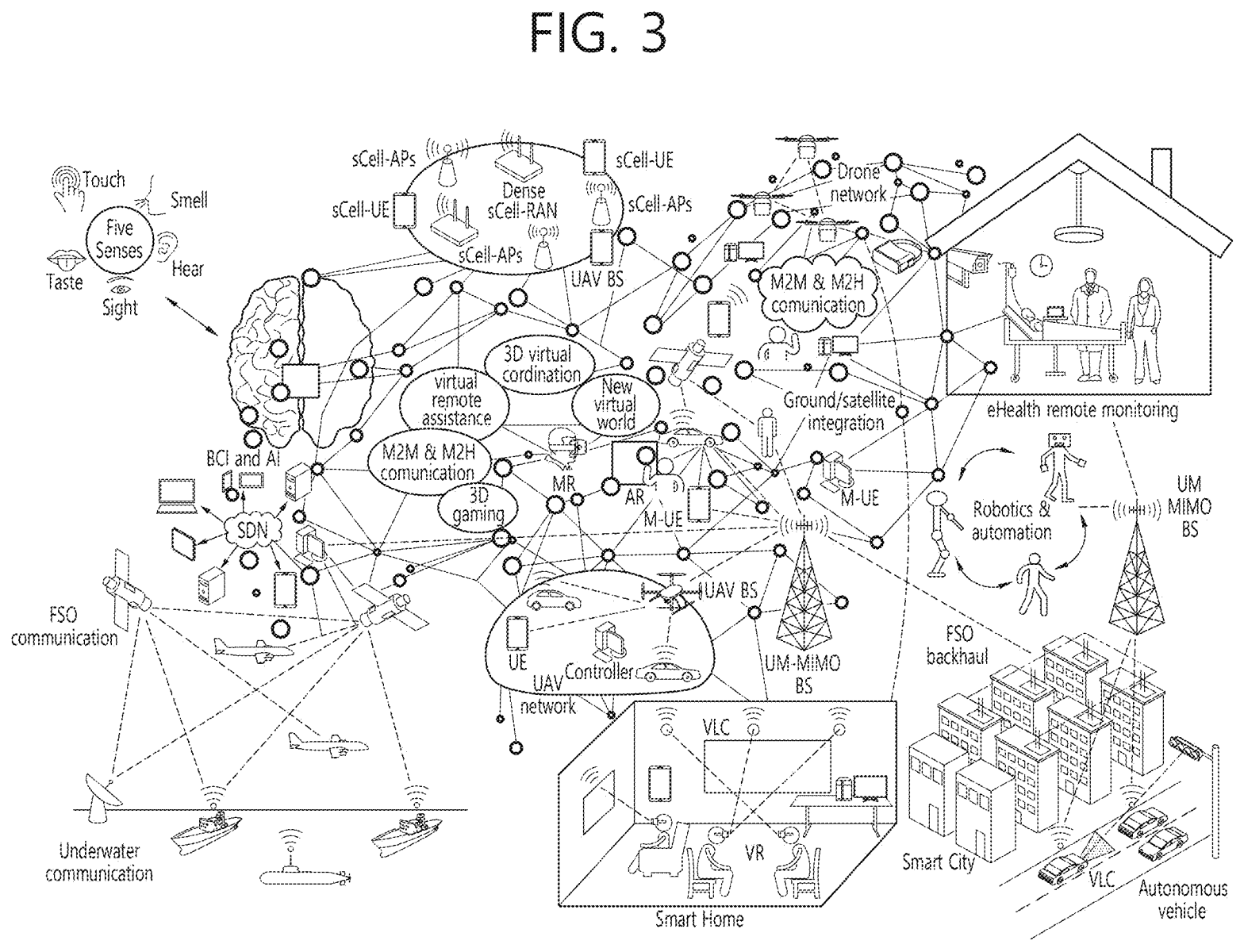

FIG. 3 is a diagram showing an example of a communication structure that can be provided in a 6G system.

The 6G system is expected to have simultaneous wireless communication connectivity that is 50 times higher than that of the 5G wireless communication system. URLLC, a key feature of 5G, will become an even more mainstream technology in 6G communications by providing end-to-end delays of less than 1 ms. The 6G system will have much better volumetric spectral efficiency, unlike the frequently used area spectral efficiency. 6G systems can offer very long battery life and advanced battery technologies for energy harvesting, so mobile devices will not need to be charged separately in a 6G system. New network characteristics in 6G may include:

Satellites integrated network: To provide a global mobile population, 6G is expected to be integrated with satellites. The integration of terrestrial, satellite, and airborne networks into a single wireless communication system is critical to 6G.

Connected intelligence: Unlike previous generations of wireless communication systems, 6G is revolutionary and will update the wireless evolution from "connected things" to "connected intelligence". AI can be applied at each step of the communication process (or each step of signal processing, as we will see later).

Seamless integration wireless information and energy transfer: 6G wireless networks will deliver power to charge the batteries of devices such as smartphones and sensors. Therefore, wireless information and energy transfer (WIET) will be integrated.

Ubiquitous super 3D connectivity: Access to networks and core network functions from drones and very low Earth orbit satellites will create super 3D connectivity at 6G ubiquity.

In the above new network characteristics of 6G, some general requirements may be as follows.

Small cell networks: The idea of small cell networks was introduced to improve the quality of received signals in cellular systems as a result of improved throughput, energy efficiency, and spectral efficiency. As a result, small cell networks are an essential characteristic for 5G and beyond 5G (5 GB) communication systems. Therefore, 6G communication systems will also adopt the characteristics of small cell networks.

Ultra-dense heterogeneous networks: Ultra-dense heterogeneous networks will be another important characteristic of 6G communication systems. Multi-tier networks composed of heterogeneous networks will improve overall QoS and reduce costs.

High-capacity backhaul: Backhaul connectivity is characterized by high-capacity backhaul networks to support large volumes of traffic. High-speed fiber optics and free-space optics (FSO) systems are possible solutions to this problem.

Radar technology integrated with mobile technology: High-precision localization (or location-based services) over communications is one of the features of 6G wireless communication systems. Therefore, radar systems will be integrated with 6G networks.

Softwarization and virtualization: Softwarization and virtualization are two important features that are fundamental to the design process in a 5 GB network to ensure flexibility, reconfigurability, and programmability. In addition, billions of devices may be shared on a shared physical infrastructure.

<THz (Terahertz) Communications>

Figure 4:
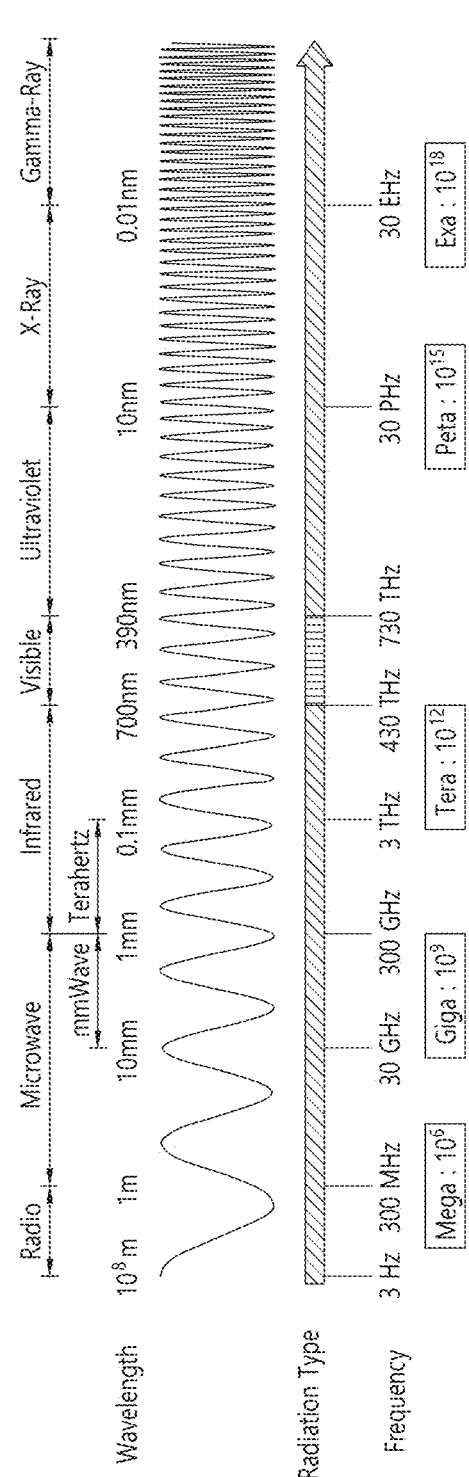
FIG. 4 illustrates an electromagnetic spectrum.

FIG. 4 illustrates the electromagnetic spectrum.

The data transfer rate can be increased by increasing the bandwidth. This can be accomplished by using sub-THz communications with wide bandwidth and applying advanced massive MIMO technology. THz waves, also known as submillimeter radiation, typically represent a frequency band between 0.1 THz and 10 THz with a corresponding wavelength in the range 0.03 mm~3 mm. The 100 GHz-300 GHz band range (Sub THz band) is considered the main part of the THz band for cellular communications. Adding the Sub-THz band to the mmWave band increases 6G cellular communication capacity. Among the defined THz bands, 300 GHz~3 THz is in the far infrared (IR) frequency band.

The key characteristics of THz communications include (i) widely available bandwidth to support very high data rates, and (ii) high path loss at high frequencies (highly directional antennas are indispensable). The narrow beamwidth produced by highly directive antennas reduces interference. The small wavelength of THz signals allows a much larger number of antenna elements to be integrated into devices and BSs operating in this band. This enables the use of advanced adaptive array techniques that can overcome range limitations.

In the following, a method is presented for enabling beam operation in high frequency band communications by utilizing a beam generated such that a single beamformed signal transmitted from a transmitting end appears in different phases at different angles.

Orbital Angular Momentum (OAM) based signal generation techniques have been recently developed in wireless communication systems. OAM is a technique that can achieve high transmission speed by performing mode division multiplexing transmission through modes with different helical phase fronts.

A signal can be generated so that its phase changes linearly in a specific direction along an arc in a plane perpendicular to the direction of travel of the electromagnetic wave. As the phase of the signal changes, it has different modes. In OAM, signals with different modes have phases that change at different rates in space, and the orthogonality of these phases can be used to separate multiple superimposed signals at the receiving end.

An OAM-based signal generation technique that uses radio waves traveling in twists and turns, like a spiral staircase, can create different OAM modes within the same frequency on the same wavelength of radio waves, and multiply the amount of data transferred by the number of frequency twists. If the radio waves can be twisted up to three times, the amount of data transferred will be tripled. In other words, in order to double the amount of data transferred, the radio waves should support different (twisted) modes, and data should be transferred in each of these modes to maximize the amount of data transferred.

OAM mainly uses a light source to generate and utilize this twisted mode signal. Depending on the technique for generating these modes, there are various methods such as HG (Hermite-Gaussian) mode and LG (Laguerre-Gaussian) mode.

FIG. 5 illustrates the intensity and phase of signals generated in HG mode or LG mode.

FIG. 5(a) illustrates the signal intensity and phase in HG mode, and FIG. 5(b) illustrates the signal intensity and phase in LG mode.

These OAM-based signals are primarily utilized within the Fresnel domain. This is because in order to transmit and receive data, both the strength of the received signal and the angular momentum of the signal should be perceived by the receiver's area. The field strength changes under the influence of obstructions (i.e., diffraction, reflection, etc.), and to avoid these effects, a region of an ellipse that is free of obstructions that affect reflected or diffracted waves is called a Fresnel zone.

Generation of OAM signals has historically been accomplished by placing a phase-shifting filter in front of the transmitting signal source and utilizing the time delay in passing through the filter to phase-shift the signal. There have been efforts to do this for RF signals as well. For example, there have been methods using filters, and some research has utilized phase shifting.

Figure 6:
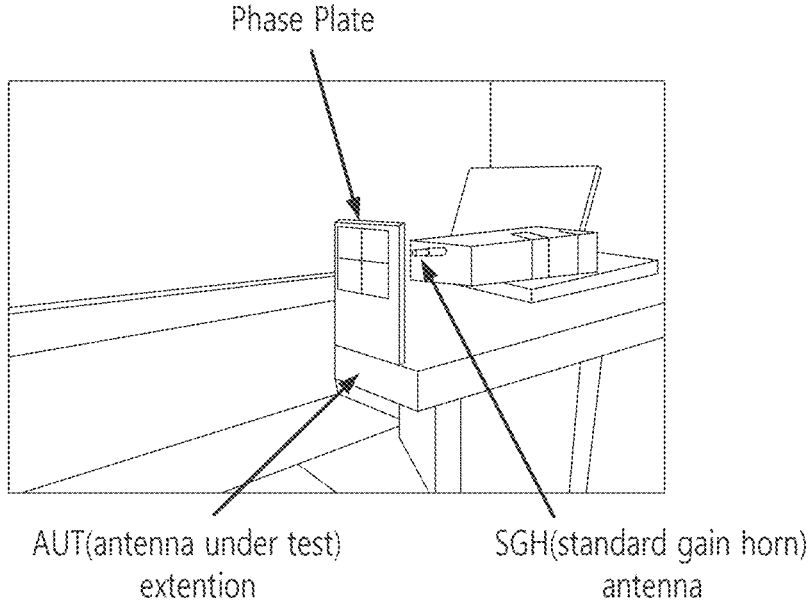
FIG. 6 illustrates a device that applies OAM to an RF signal using a filter.

FIG. 6 illustrates a device that applies OAM to an RF signal using a filter.

Referring to FIG. 6, a phase plate is placed in front of the radiated RF signal, and the phase of the RF signal passing through this phase plate is shifted.

Figure 7:
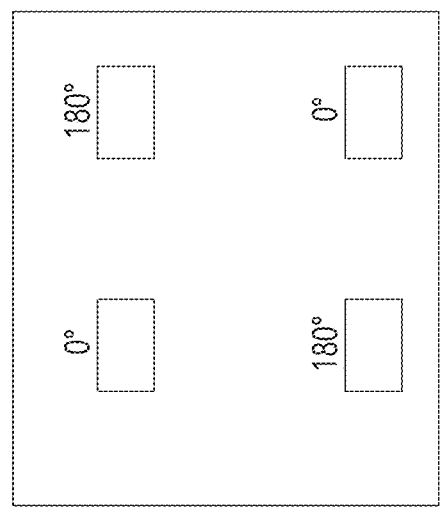
FIG. 7 illustrates a device that applies OAM to an RF signal using a phase shifter.
Figure 8:
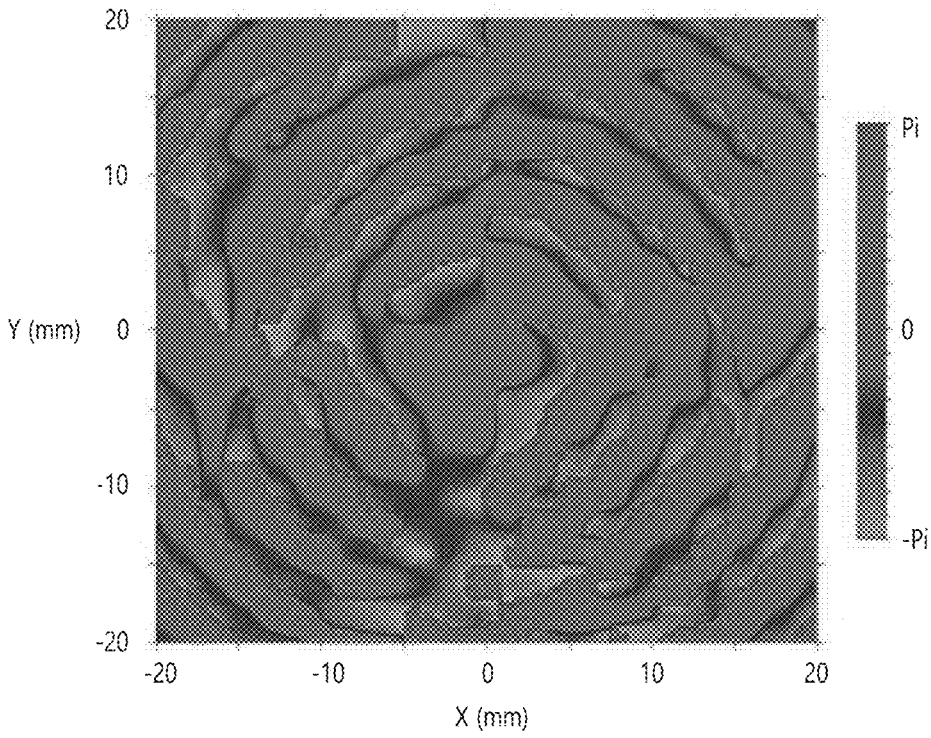
FIG. 8 shows the phase form of an RF signal applying OAM using a phase shifter.

FIG. 7 illustrates a device that applies OAM to an RF signal using a phase shifter, and FIG. 8 shows the phase form of an RF signal to which OAM is applied using a phase shifter.

Referring to FIG. 7, four patch antennas are used, and the length of the propagation line can be adjusted to give a phase shift of 0 and 180 degrees. In this case, the phase shape shown in FIG. 8 can be achieved, which means that the OAM technique can also be applied to RF signals used for wireless communication.

<Method of Beam Operation>

In 5G NR, mmWave can be used, and multiple antennas may be used to overcome path loss in mmWave. In order to solve the problem of using complex RF structures, hybrid beamforming is adopted in 5G NR. Hybrid beamforming is a mixture of analog beamforming using phase transitions at the RF end and digital MIMO signal processing in the baseband. In particular, it is intended to overcome path loss by maximizing the gain from analog beamforming. At this time, the beam matching process of the transmitting and receiving ends by analog beamforming becomes the key to smooth communication.

Figure 9:
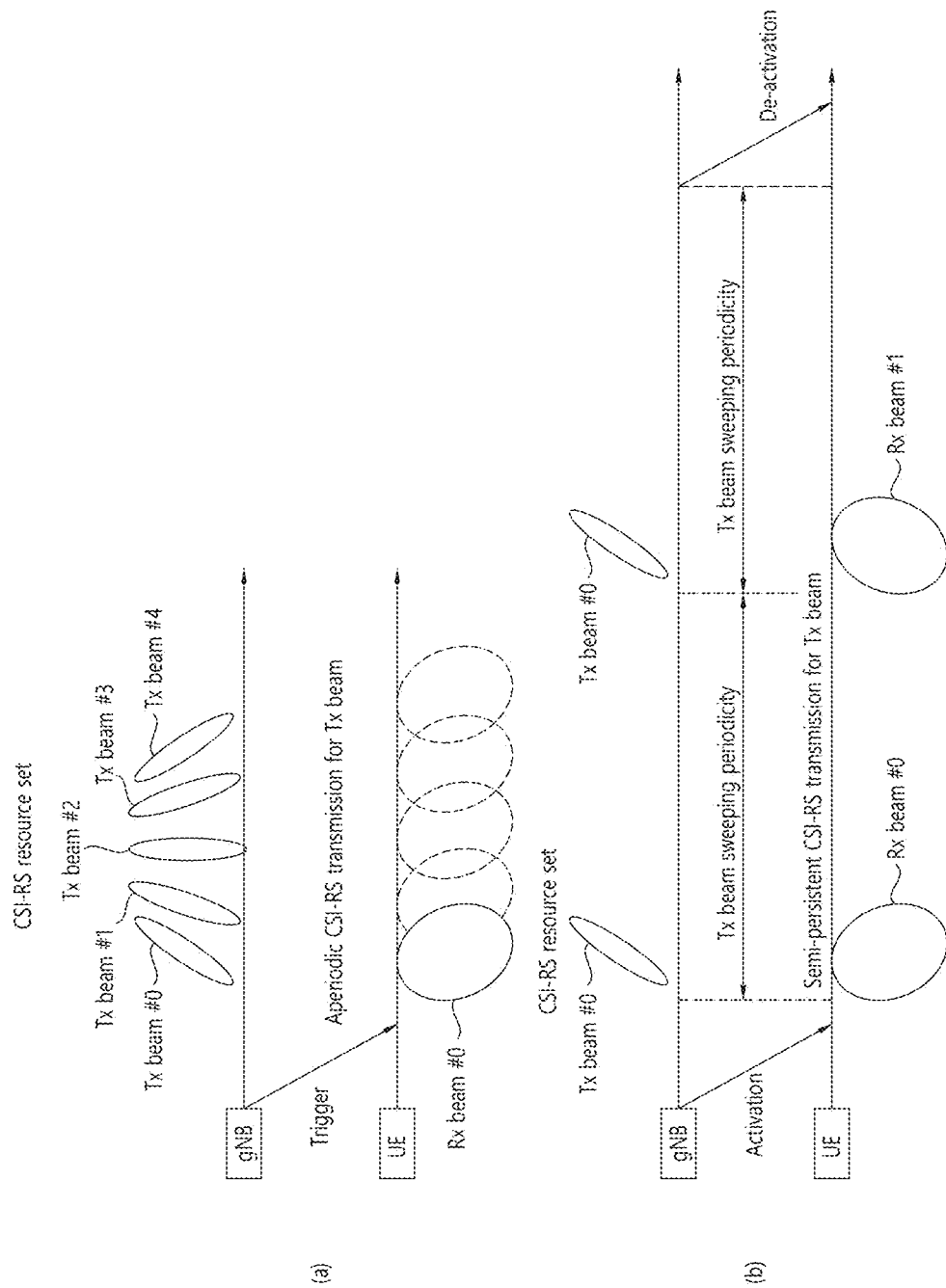
FIG. 9 illustrates a method of performing beam matching in 5G NR.

FIG. 9 illustrates a method of performing beam matching in 5G NR.

Referring to (a) of FIG. 9, the transmitter end (e.g., gNB) utilizes an aperiodic reference signal (e.g., aperiodic CSI-RS, which may be referred to as CSI-RS for transmission beam matching) in the entire beam direction to provide transmission (Tx) beams. For example, transmission beams #0 through #4 may be provided. This is to allow the receiving end (e.g., a UE) to recognize the optimal beam among the multiple beams provided. The receiving end finds the optimal transmission beam among the beams from the transmitting end through measurement. The receiving end feedbacks/transmits the beam index of the optimal transmission beam (e.g., transmission beam #0) to the transmitting end.

Thereafter, as shown in (b) of FIG. 9, the transmitter may continuously transmit the corresponding beam (e.g., transmission beam #0) utilizing a periodic reference signal (periodic CSI-RS, which may be referred to as CSI-RS for matching the reception beam). The receiving end then changes the receiver's configurations/spatial parameters/filters/direction, etc. to find the optimal reception beam. Through this process, the receiver's configurations/spatial parameters/filters/direction, etc. corresponding to the optimal transmission beam can be found, and the receiver's configurations/spatial parameters/filters/direction, etc. can be expressed as the reception beam. In other words, the reception beam can be the to be a configuration for tuning the receiver at the receiving end to receive the transmission beam.

In other words, in conventional beam matching, the transmitter sends the entire beams (using aperiodic CSI-RSs) and the receiver selects and informs the transmitter of a specific beam, and the transmitter periodically transmits the specific beam (using periodic CSI-RS) and determines the final reception beam from the periodic transmissions.

Future wireless communication systems that can use THz may have a much larger number of beams. It is not efficient to apply the conventional beam operation method to this future wireless communication system. In an environment where path loss is very large, such as THz, beam gain should be maximized by using many antennas, which requires using many beams with very narrow beam widths in the entire service area. If the conventional beam operation method is applied to such an environment, not only does it take a lot of time, but also a lot of system overhead occurs because so many reference signals should be transmitted, which reduces overall efficiency.

An efficient beam operation method that takes these points into account is needed. The present disclosure provides a method of providing a signal so that the degree of beam mismatch can be directly measured and a method of operating a beam using this method.

To enable direct measurement of beam mismatch, beam generation can utilize a variety of methods, including but not limited to. This disclosure presents a novel method for operating beams at high bandwidths.

FIG. 10 illustrates the concept of the beam consistency measurement method proposed in this disclosure.

(a) of FIG. 10 illustrates the reception intensity characteristics by beam #1 and beam #2, and (b) of FIG. 10 illustrates the phase shift characteristics by beam #1 and beam #2.

Referring to (a) and (b) of FIG. 10, a transmitting end (e.g., base station) transmits beam #1 and beam #2 that satisfy specific conditions. The above specific conditions are explained in detail below.

Referring to (a) and (b) of FIG. 10, a receiving end (e.g., a UE) may obtain a magnitude and phase value of a signal received by beam #1 and, from the magnitude and phase value of the signal received by beam #2, obtain mismatch information indicative of the degree to which beam #1 is mismatched with respect to a matching position of beam #1. The receiving end may utilize the intensity difference and the phase difference of the received signals of beam #1 and beam #2 to estimate the relative position of the receiving end to the extent to which the position of the receiving end is mismatched with beam #1 from the correct beam direction (matching position) of beam #1.

Figure 11:
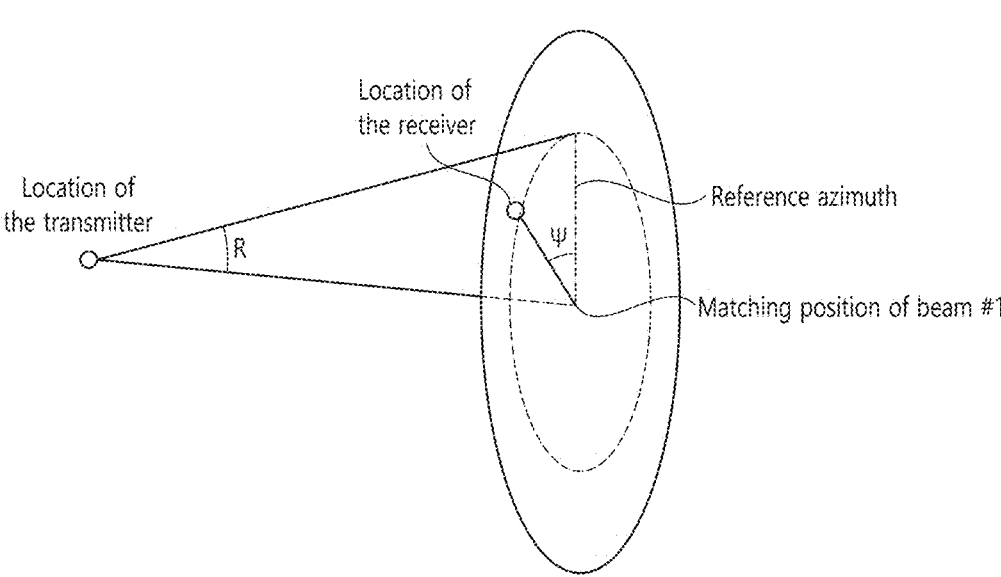
FIG. 11 illustrates beam mismatch information.

FIG. 11 illustrates beam mismatch information.

Referring to FIG. 11, let's assume that the receiver is spaced a certain distance away based on the matching position of beam #1 when the transmitter transmits beam #1. The amount of beam mismatch that occurs from the matching position of beam #1 to the actual location of the receiver can be expressed as R and $\Psi$. Here, R may be information related to the distance from the beam matching position. $\Psi$ means rotation information from the reference azimuth to the mismatch position. The reference azimuth can be set based on the phase provided by beam #1.

At this time, beam #1 and beam #2 may satisfy at least one of the conditions below.

Condition 1: Beam #1 maintains the same phase value within the main lobe of the beam.

Condition 2: Beam #2 provides different phase values depending on the angle ($\Psi$) rotated from the reference azimuth.

Condition 3: The reference azimuth of beam #2 is determined based on beam #1.

Condition 4: The beam gain of beam #2 provides a different value than the beam gain of beam #1.

Condition 5: Beam #2 provides different beam gains depending on the distance angle (R) from the beam matching position of beam #1.

Condition 6: The beam matching position of beam #1 and the beam center of beam #2 are coincident with each other (beam #1 and beam #2 overlap each other).

Condition 7: Beam #2 has a greater or equal outer angle (described below) than beam #1.

Condition 8: Provide a reference signal (RS1) generated based on beam #1 and a reference signal (RS2) generated based on beam #2.

Figure 12:
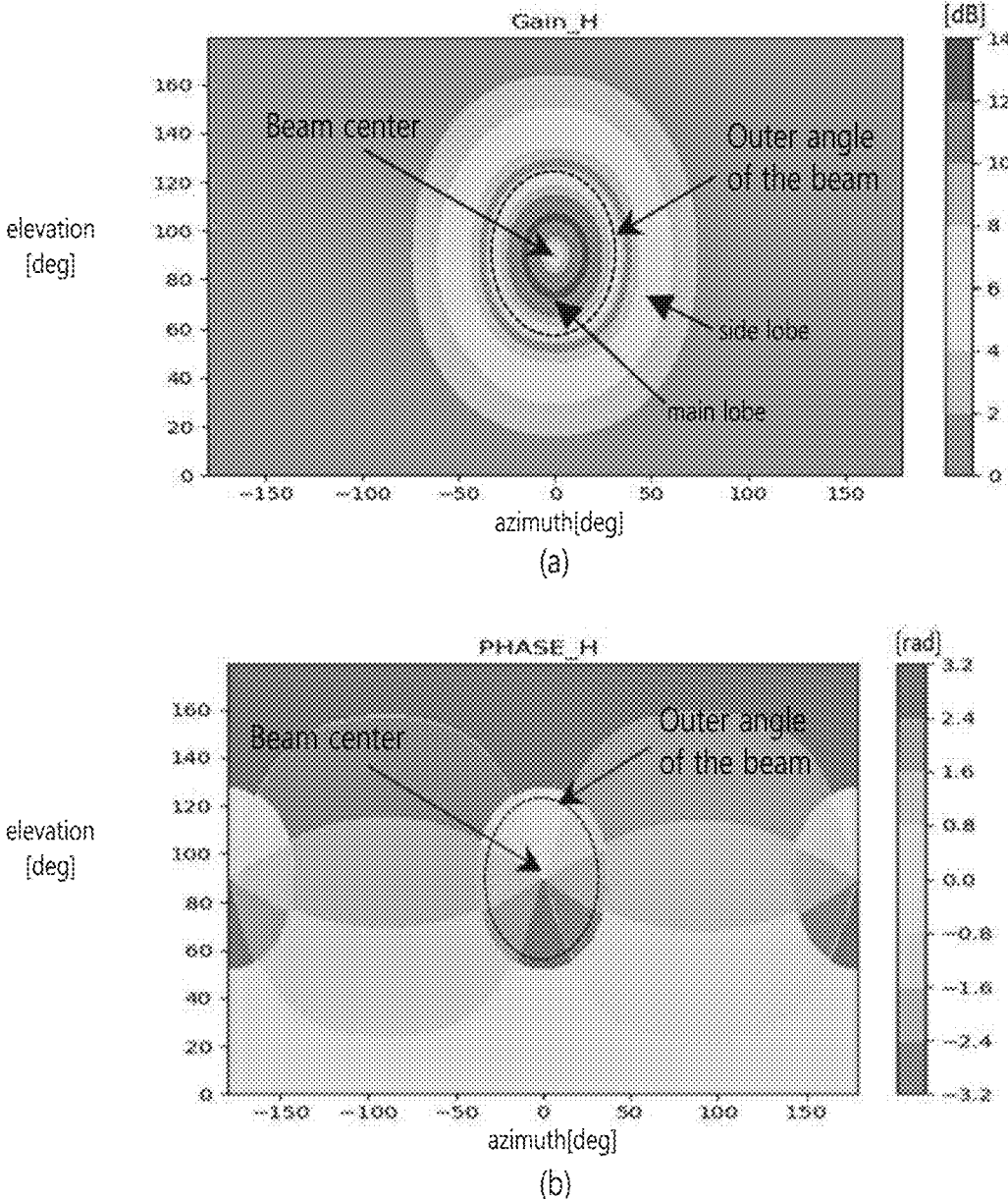
FIG. 12 shows the outer angle of the beam.

FIG. 12 shows the outer angle of the beam.

(a) of FIG. 12 illustrates the gain characteristics of beam #2, and (b) of FIG. 12 illustrates the phase characteristics of beam #2. Referring to (a) of FIG. 12, the signal of beam #2 is not observed at the center of the beam (this is defined as the 'beam center'). The first ring-shaped beam with a strong signal radiating from the center of the beam is defined as the main lobe, and the second and subsequent larger observed rings are defined as the side lobes. In this case, the area where the signal is observed by the first ring-shaped beam can be defined as the outer angle of beam #2.

At least one of conditions 1-8 above may be satisfied to directly obtain the beam mismatch position. In this case, the mismatch position relative to the beam matching position (or beam center) of beam #1 can be determined from the magnitude and measured phase values of beam #1 and beam #2 at a UE located within the beam outer angle of beam #2.

For example, the UE can measure the magnitude and phase value of the signal within the main lobe of beam #1 and measure the magnitude and phase value of the signal of beam #2. For example, the reference azimuth of beam #2 may be determined by the phase value of beam #1. Beam #2 provides different phase values depending on i) the angle (Ψ) rotated from the above reference azimuth, and ii) different beam gains depending on the distance angle (R) away from the beam matching position of beam #1. T Therefore, knowing the signal magnitude (beam gain) and phase value of beam #2, the R and Ψ can be known. In other words, it is possible to know how far the UE is from the matching position of beam #1 (in other words, how mismatched beam #1 is).

Figure 13:
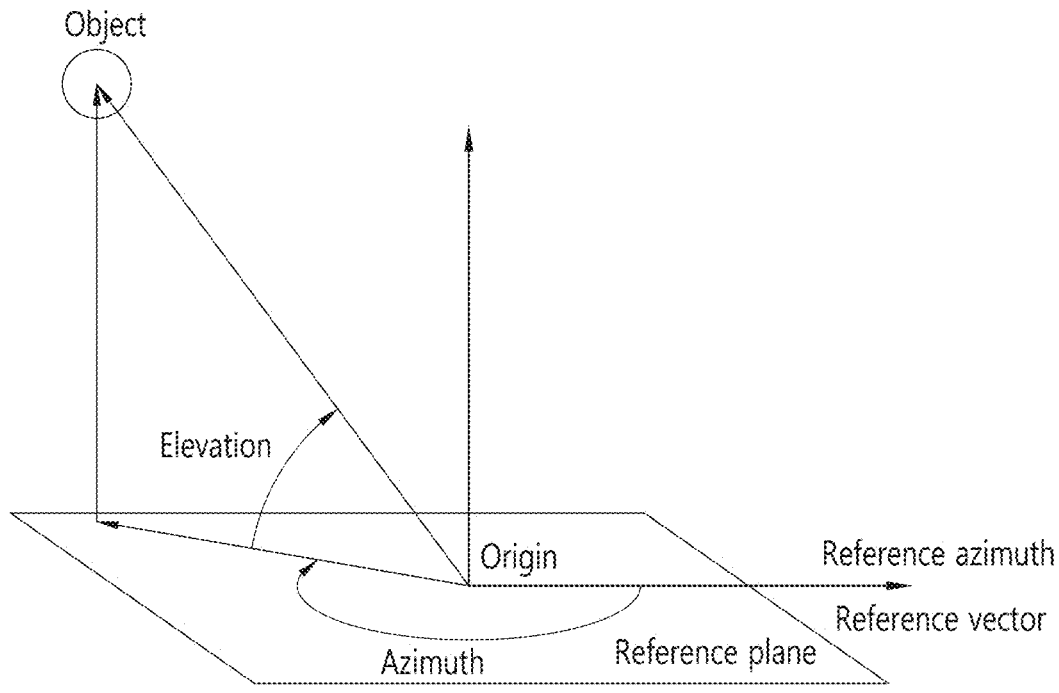
FIG. 13 shows azimuth and elevation angles.

FIG. 13 shows azimuth and elevation angles.

Referring to FIG. 13, the azimuth angle is an angle measured in a spherical coordinate system and means the angle formed by projecting the vector from the observer at the origin to the object onto the reference plane and making it with the reference vector on the reference plane. The direction of the reference vector can be used as the reference azimuth. The elevation angle is an angle that represents the height of the object and refers to the angle between the reference plane and the object as seen from the origin. The relative positions of the receiver and transmitter can also be measured/identified based on azimuth and elevation angles.

Figure 14:
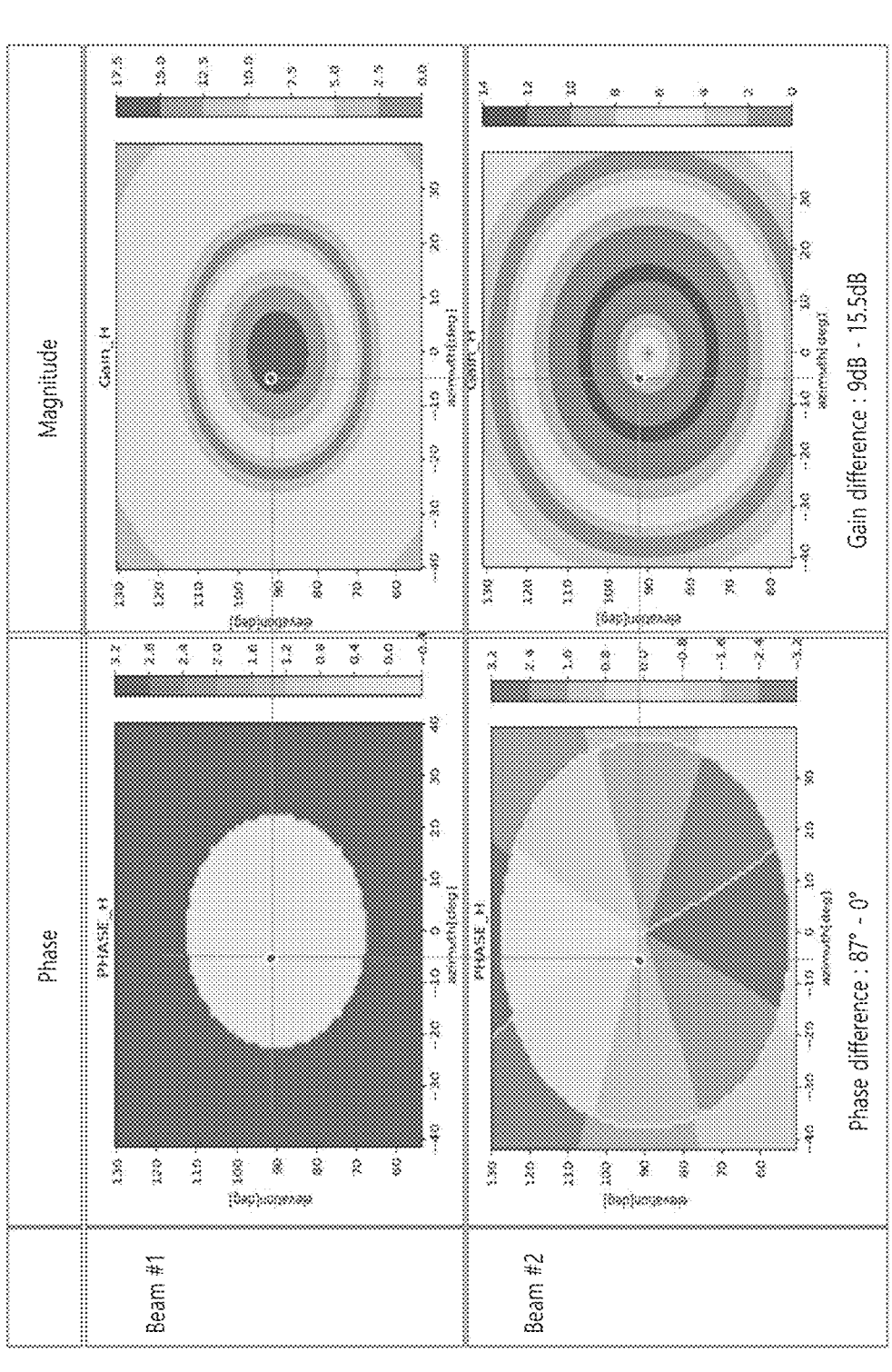
FIG. 14 shows the magnitude and phase of beam #1 and beam #2 in the spatial plane.

FIG. 14 shows the magnitude and phase of beam #1 and beam #2 in the spatial plane.

Referring to FIG. 14, the beam direction of beam #1 may have an azimuth angle of 0 degrees and an elevation angle of 90 degrees. In this case, the position of the UE may be, for example, at an azimuth angle of 5 degrees and an elevation angle of 93 degrees. In this case, the position of the UE may be estimated from beam #1 and beam #2.

The beam matching position of beam #1 and the beam center of beam #2 coincide with each other, beam #2 provides different phase values depending on the angle (Ψ) rotated from the reference azimuth set relative to the phase of beam #1, and beam #2 provides different beam gains depending on the distance angle (R) away from the beam matching position of beam #1. Therefore, based on the phase value and beam gain value measured for beam #2, it is possible to estimate how far the UE is mismatched from the correct beam direction of beam #1.

For the above operation, the transmitting end may provide at least two different types of reference signals (RS).

Specifically, let's assume that the channels of the transmitting end and the receiving end are $H(=|h_a|\exp j(\theta_h))$ and that beams #1 and #2 satisfy the above-mentioned conditions 1~8. In this case, the magnitude and phase of beam #1 transmitted by reference signal 1 (RS1) are respectively $sqrt[A_1(\theta_a, \theta_e)]\exp j(\Phi_{1\_a,e})$, and the let the magnitude and phase of beam #2 be $sqrt[A_2(\theta_a, \theta_e)]\exp j(\Phi_{2\_a,e})$, respectively. Here, sqrt(x) is a function that calculates the non-negative value of the square root of x. $\Theta_a$ and $\Theta_e$ sequentially represent the azimuth and elevation angles, and $\Phi_{1\_a,e}$ and $\Phi_{2\_a,e}$ represent the phases of signals transmitted by beam #1 and beam #2 at the corresponding azimuth and elevation angles, respectively. $A_1(\theta_a, \theta_e)$ and $A_2(\theta_a, \theta_e)$ mean the beam gain at the corresponding azimuth and elevation angles of beam #1 and beam #2, respectively.

In FIG. 14, where the azimuth and elevation angles are 5 degrees and 93 degrees, $\Phi_{1\_a,e}$, $\Phi_{2\_a,e}$, $A_1(\theta_a, \theta_e)$, and $A_2(\theta_a, \theta_e)$ are 0 degrees, 87 degrees, 15.5 dB and 9 dB, respectively.

The received signals y1 and y2 by beam #1 and beam #2 are respectively as follows.

$$y_1 = |h_a|sqrt[A_1(\theta_a, \theta_z)]\exp j(\Phi_{1\_a,e} + \theta_h) \qquad \text{[Equation 1]}$$

$$y_2 = |h_a|sqrt[A_2(\theta_a, \theta_z)]\exp j(\Phi_{2\_a,e} + \theta_h) \qquad \text{[Equation 2]}$$

If the channel does not change during the transmission interval of beam #1 and beam #2 (i.e., RS1 and RS2 are provided within a coherent time or coherent frequency), then the position information of y2 away from the beam matching location can be obtained from the received y1.

The direction angle (Ψ) of the mismatch position from the center position of beam #1 and the distance angle R away from the center position can each be estimated as follows.

$$\Psi = angle(y2) - angle(y1) = \Phi_{2\_a,e} - \Phi_{1\_a,e} \qquad \text{[Equation 3]}$$

$$R = f_{angle}(abs(y2)/abs(y1)) = f_{angle}(sqrt[A_2(\theta_a, \theta_e)/A_1(\theta_a, \theta_e)]) \quad \text{[Equation 4]}$$

Here, $f_{angle}(x)$ is a function that can obtain the value of R according to the value of x, and it is described later. As described above, mismatch position information can be directly obtained by utilizing the phase and beam gain information of beam #1 and beam #2.

In the example of FIG. 14, Ψ=87 degrees and R=−6.5 dB, so the mismatch position that satisfies this can be seen.

The receiving end transmits information related to the mismatch position to the transmitting end so that beam tracking can be performed.

Beam #1∈ {$b_1, b_2, \ldots, b_n, \ldots, b_N$}, where N means the total number of beams #1 used by the transmitter.

Beam #2∈ {$c_1, c_2, \ldots, c_m, \ldots, c_M$}, where M means the total number of beams #2 used by the transmitter.

In this case, in order to perform beam tracking, the transmitting end may provide at least one of the information 1 to information 6 below to the receiving end.

Information 1: Combination information (or set of combination information) of beam #1 and Beam #2.

It refers to the combination of beam #1 and beam #2 that satisfies the above-mentioned condition 3 and can be expressed as ($b_n, c_m$). At this time, it means that $b_n$ and $c_m$ can overlap each other in space. For example, in the case of ($b_1, c_3$), $b_1$ and $c_3$ can be beamformed in the same beam direction while satisfying the above conditions 1~6. Similarly, the case of ($b_1, c_3, c_4$) means that beam #2 transmitted overlapping with $b_1$ is $c_3$ and $c_4$. At this time, some beams of beam #2 may not satisfy condition 6 above. In the same way, the case of ($b_1, b_2, c_4$) means that $b_1$ and $b_2$ are transmitted while overlapping with $c_4$, and some beams of beam #1 may not satisfy condition 6 above.

Information 2: Configuration information for beam #1

That is, the direction ($\Theta_{a\_n}, \Theta_{e\_n}$) toward which beam #1 ($b_n$, n∈{1, 2, . . . , N}) is directed.

Radiation pattern gain value ($A_1(\theta_a, \theta_e)$) when the beam is directed to ($\theta_{a\_n}, \theta_{e\_n}$), Phase information ($\Phi_{1\_a,e}$) generated when the beam is directed to ($\theta_{a\_n}, \theta_{e\_n}$).

Information 3: Configuration information for beam #2

That is, the direction ($\Theta_{a\_m}, \Theta_{e\_m}$) toward which beam #2 ($c_m$, ∈{1, 2, . . . , M}) is directed, Radiation pattern gain value ($A_2(\theta_a, \theta_e)$) when the beam is directed to ($\theta_{a\_m}, \theta_{e\_m}$), Phase information ($\Phi_{2\_a,e}$) generated when the beam is directed to ($\theta_{a\_m}, \theta_{e\_m}$).

Information 4: Reference azimuth information satisfying $\Phi_{1\_a,e}=\Phi_{2\_a,e}+k$ (where k is a predefined value, for example, 0).

Information 5: Information on the direction vector in space indicated by the reference azimuth, Information 6: Adjacent beam information (e.g., adjacent beam information by T and R based on beam #1) can be shared in advance.

In information 2 and information 3, the beam direction may use a beam index.

In Information 3, $\Phi_{2\_a,e}$ may mean the direction of rotation of the beam (e.g., clockwise or counterclockwise) and the total number of rotations (e.g., 360 degrees×3=1080 degrees in the case of 3) based on the reference azimuth angle.

In order for the receiving end to estimate R, a method of compressing and transmitting the information 2 and information 3 may also be considered.

$$R = f_{angle\_n}(x)\,|_{\Psi=p} \qquad \text{[Equation 5]}$$

$f_{angle\_n}(x)$ that satisfies Equation 5 above can be defined. Here, x is the beam gain ratio of beam #1 and beam #2 and can be defined as $x=\text{sqrt}(A_2(\theta_a, \theta_e)/A_1(\theta_a, \theta_e))$. However, it is not limited to this. For example, it may be defined as $x=A_2(\theta_a, \theta_e)/A_1(\theta_a, \theta_e)$.

$f_{angle\_n}(x)|_{\Psi=p}$ is a function that can infer the value of the distance angle R by the beam gain ratio x when $\Psi$ is p degrees at the beam index n of reference signal 1 (RS1), and $f_{angle\_n}(x)$ can be defined according to several predetermined p values.

$$x = f_{angle\_n}^{-1}(R)\,|_{\Psi=p} = aR^2 + bR \qquad \text{[Equation 6]}$$

In this case, it is also possible to approximate and use the same method as Equation 6 above. In other words, the function for $f_{angle\_n}^{-1}(R)$ can be modeled as a higher-order function, and the beam gain information of information 2 and information 3 can be shared by transmitting the coefficients for these to the receiving end.

Figure 15:
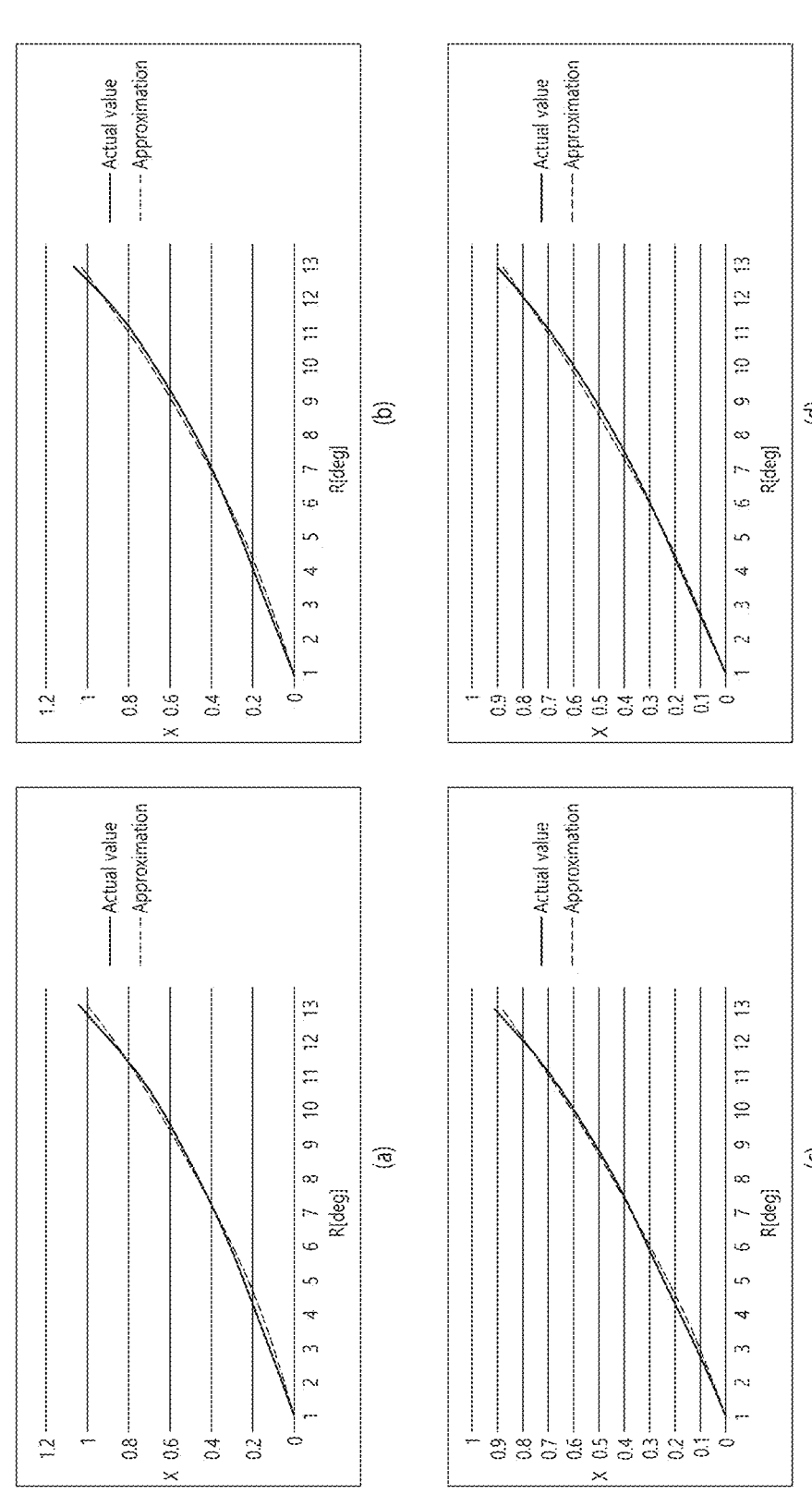
FIG. 15 is an example of $f_{angle\_n}^{-1}(R)$.

FIG. 15 shows examples of $f_{angle\_n}^{-1}(R)$.

Referring to FIG. 15, an example of $f_{angle\_n}^{-1}(R)$ when the beam is directed in the corresponding direction is shown in the case where the azimuth angle is 20 degrees and the elevation angle is 70 degrees when generating a spatial phase shift beam.

That is, in (a), (b), (c), and (d) of FIG. 15, when the values of p, a, and b are sequentially p=0 degrees (a=0.0032, b=0.045) and p=90 degrees (a=0.0032, b=0.045), p=180 degrees (a=0.002, b=0.05), p=270 degrees (a=0.0018, b=0.052), it shows the actual R according to the beam gain ratio x and the error when obtaining an approximation of R($\hat{R}$) as a result of $f_{angle\_n}^{-1}(R)$.

For example, in (b) of FIG. 15, when the $\Psi$ value is estimated by $\Psi=\text{angle}(y2)-\text{angle}(y1)=\Phi_{2\_a,e}\sim\Phi_{1\_a,e}$ (e.g., 90 degrees), using this, the distance angle away from the beam matching position (e.g., R=9.5 degrees) can be estimated by using the received signal measurement ratio of beam #1 and beam #2 (e.g., x=0.6). The value where $\Psi\neq p$ can be estimated by using p=0 degrees, 90 degrees, 180 degrees, and 270 degrees (e.g., interpolation).

The direction vector in space by the reference azimuth can be assumed to be the reference direction vector when the

[1,0,1] vector in the Cartesian coordinate system is axially rotated by the beam direction when the transmitter is at the origin and the x-axis is in the bore sight direction (0 degrees azimuth, 90 degrees elevation). For example, a beam with an elevation angle of 70 degrees and an azimuth angle of 20 degrees may rotate −20 degrees on the y-axis and 20 degrees on the z-axis. If each coefficient according to the method presented above is defined according to the value of each beam direction ($\theta_a$, $\theta_e$) and p, the R value can be obtained from the received signal magnitude components of beam #1 and beam #2.

FIG. 16 illustrates a method of operating a receiver in a wireless communication system.

Referring to FIG. 16, a receiver (e.g., a wireless device, such as a UE, relay station. IAB node, etc.) receives configuration information for a first beam (beam #1) and a second beam (beam #2) from a transmitter (which may be a network or other UE, such as a base station, relay station, Integrated Access and Backhaul (IAB) node) (S1610). The configuration information may include at least one of, for example, a directivity value for each of the first beam and the second beam, a radiation pattern gain value based on the directivity value, and a phase value generated based on the directivity value. It may also include information about what measurement information should be generated/fed back for each beam.

Here, the first beam and the second beam are beams that satisfy predetermined conditions. For example, i) the first beam maintains the same phase value within the main lobe of the beam, ii) the second beam provides different phase values depending on the angle at which it is rotated from a reference azimuth, iii) the reference azimuth of the second beam is determined based on the first beam, iv) the beam gain of the second beam is a different value than the beam gain of the first beam, v) the second beam provides different beam gains depending on a distance angle (R as described above) away from the matching position of the first beam, vi) the matching position of the first beam and the beam center of the second beam coincide with each other, and vii) the second beam has a larger or equal outer angle than the first beam. Further, the first beam and the second beam may each include/provide a reference signal.

Based on the configuration information, the receiver measures the first beam and the second beam and generates beam mismatch information (SS1620).

For example, the beam mismatch information is based on the first received intensity (magnitude) and first phase value of the first beam and the second received intensity (magnitude) and second phase value of the second beam. This may be information indicating the degree of mismatch of the first beam based on the matching position of the first beam.

The beam mismatch information may include, for example, a first angular information (e.g., R as described above) indicative of a distance the receiver is spaced from the matching position of the first beam, and a second angular information (e.g., $\Psi$ as described above) indicative of a rotation angle of the receiver from a reference azimuth of the matching position to a position of the receiver.

The receiver can calculate beam mismatch information by referring to Equations 3 to 6 described above.

The receiver transmits the beam mismatch information (and/or beam switching information based on the beam mismatch information) to the transmitter (which may be a network or other UE, such as a base station, a relay station, an integrated access and backhaul (IAB) node, for example) (S1630). The beam switching information may indicate one beam index corresponding to the beam mismatch information among a plurality of predetermined beam indices. For example, the receiver may select an optimal beam from among the pre-provided beam configuration information, taking into account the location of the receiver identified based on the beam mismatch information, and provide a beam index for the beam representing the optimal beam via the beam switching information. In other words, the information that the receiver feeds back can be the beam mismatch information itself, but it can also be other forms of information that reflect the beam mismatch information (e.g., beam switching information).

Figure 17:
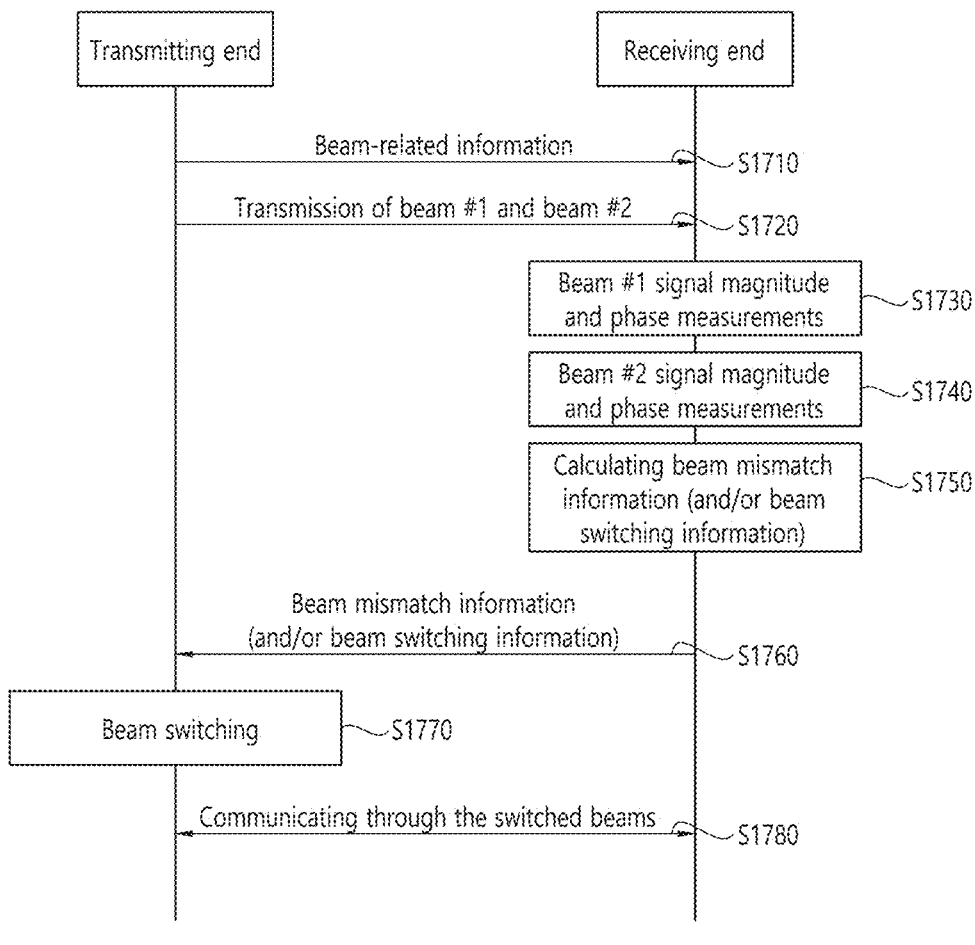
FIG. 17 illustrates the operation of a transmitting end (=transmitter) and a receiving end (=receiver) for beam tracking.

FIG. 17 illustrates the operation of a transmitting end (=transmitter) and a receiving end (=receiver) for beam tracking.

Referring to FIG. 17, the transmitting end provides beam-related information to the receiving end (S1710). For example, the transmitting end may provide a set of combination information of beam #1 and beam #2, and configuration information of beam #1 and beam #2 (the above-mentioned information 1 to 5) to the receiving end. In the case of downlink, the transmitting end may be a base station and the receiving end may be a UE, and in the case of uplink, the transmitting end may be a UE and the receiving end may be a base station. In the downlink and uplink, the transmitting end and the receiving end may be configured in different combinations. For example, in the downlink, the transmitting end may be one of a relay station, an IAB node, or another UE, and the receiving end may be a UE. In the uplink, the transmitting end may be a UE, and the receiving end may be any one of a relay station, an IAB node, or another UE.

The transmitting end transmits beam #1 and beam #2 (S1720). For example, the transmitting end may provide reference signals through beam #1 and beam #2. At this time, beam #1 and beam #2 can satisfy conditions 1 to 7.

The receiving end measures reference signals provided through beam #1 and beam #2, respectively (S1730, S1740), and calculates beam mismatch information (and/or beam switching information) based on them (S1750).

For example, the beam mismatch information may be information estimated by calculating the direction angle ($\Psi$) of the mismatch position from the center position of beam #1 and the distance angle R away from the center position, as described above. The receiving end can calculate beam mismatch information by referring to Equations 3 to 6 described above.

The receiving end can additionally generate beam switching information. The receiving end may calculate beam mismatch information and then generate beam switching information based on it. For example, the beam switching information may be a beam index for a beam indicating the optimal beam determined in consideration of the location of the UE among pre-provided beam configuration information.

The receiving end feeds back beam mismatch information (and/or beam switching information) to the transmitting end (S1760).

The transmitting end may perform beam switching based on beam mismatch information (and/or beam switching information) (S1770) and communicate with the receiving end through the switched beams (S1780).

In the beam matching method, instead of showing all possible beam candidates and selecting the optimal beam from among them, a very small number of beams (e.g., two) compared to the above beam candidates can be utilized to obtain information about the mismatch of the beam directions of the transmitter and receiver, and select the optimal beam based on the information. This allows the beam matching process to be performed with minimal time delay, even in wireless communication systems that are expected to operate a very large number of beams, such as 6G. As a result, communication efficiency can be increased and the complexity of beam operation can be reduced.

Figure 18:
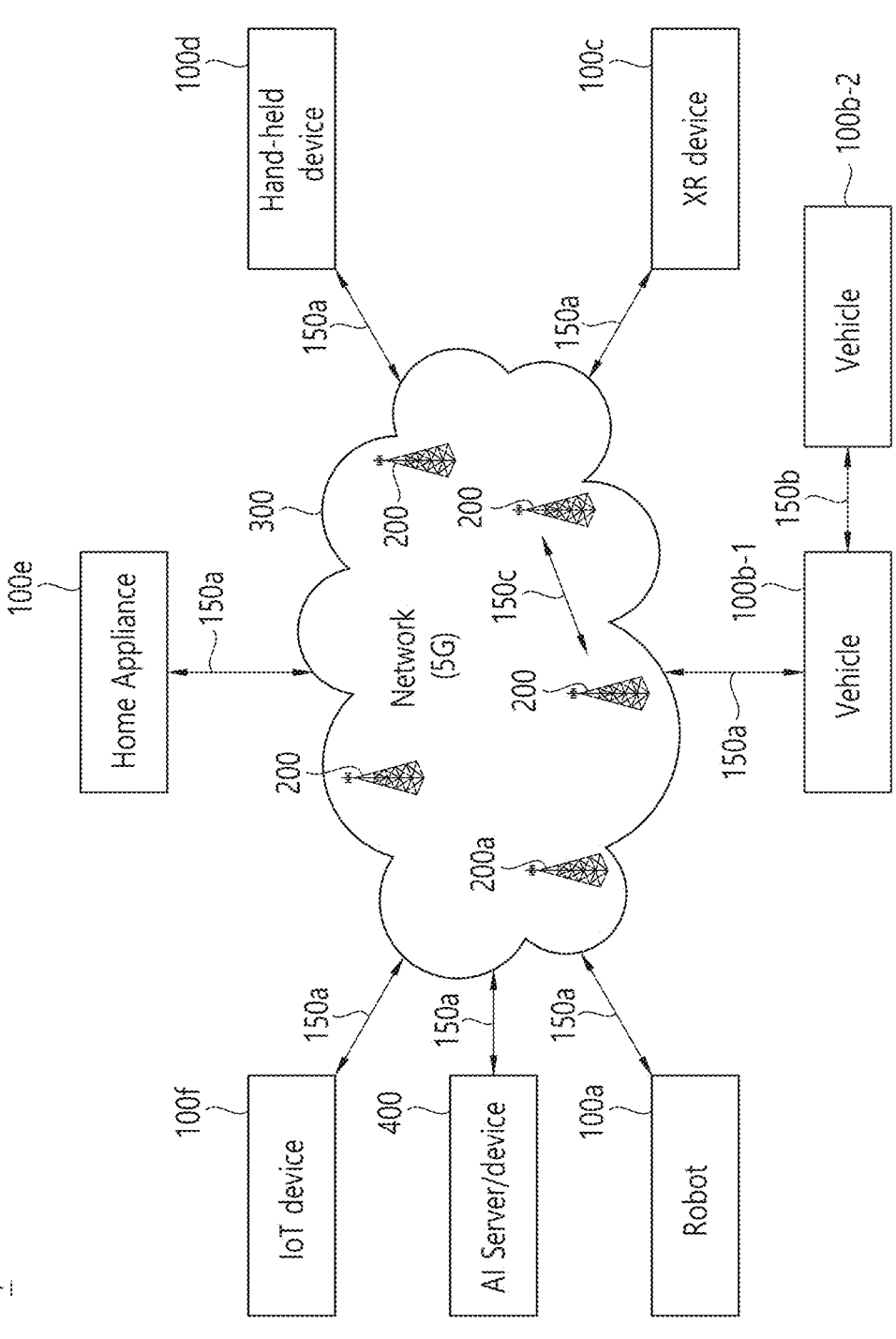
FIG. 18 illustrates a communication system 1 applicable to the present specification.

FIG. 18 illustrates a communication system 1 applied to the present specification.

Referring to FIG. 18, the communication system 1 applied to the present specification includes a wireless device, a base station, and a network. Here, the wireless device refers to a device that performs communication using a wireless access technology (e.g., 5G NR (New RAT), LTE (Long Term Evolution)), and may be referred to as a communication/wireless/5G device. Although not limited thereto, the wireless device may include a robot 100*a*, a vehicle 100*b*-1, 100*b*-2, an eXtended Reality (XR) device 100*c*, a hand-held device 100*d*, and a home appliance 100*e*), an Internet of Things (IoT) device 100*f*, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include AR (Augmented Reality)/VR (Virtual Reality)/MR (Mixed Reality) devices, and it may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The portable device may include a smart phone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and a specific wireless device 200*a* may operate as a base station/network node to other wireless devices.

Here, the wireless communication technologies implemented in the wireless devices of the present disclosure may include LTE, NR, and 6G, as well as Narrowband Internet of Things for low power communication. For example, NB-IoT technology may be an example of low power wide area network (LPWAN) technology, and may be implemented in standards such as LTE Cat NB1 and/or LTE Cat NB2, without limitation. Additionally or alternatively, the wireless communication technologies implemented in the wireless devices of this disclosure may perform communications based on LTE-M technology. In one example, LTE-M technology may be an example of LPWAN technology and may be referred to by various names, such as enhanced Machine Type Communication (eMTC). For example, LTE-M technology may be implemented in at least one of a number of different specifications, including, but not limited to, 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. Additionally or alternatively, the wireless communication technologies implemented in the wireless devices of the present disclosure may include at least one of ZigBee, Bluetooth, and Low Power Wide Area Network (LPWAN), which contemplate low power communication, and are not limited to the above designations. For example, ZigBee technology can create personal area networks (PANs) for small/low-power digital communications based on various specifications, such as IEEE 802.15.4, and can go by many names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, 150c may be established between the wireless devices 100a~100f/BS 200, BS 200/BS 200. Here, the wireless communication/connectivity can be achieved through various wireless access technologies (e.g., 5G NR) such as uplink/downlink communication 150a, sidelink communication 150b (or, D2D communication), and base station-to-base station communication 150c (e.g., relay, Integrated Access Backhaul (IAB)). The wireless communications/connections 150a, 150b, 150c allow the wireless device and the base station/wireless device, and the base station and the wireless device to transmit/receive wireless signals to each other. For example, the wireless communications/connections 150a, 150b, 150c may transmit/receive signals over various physical channels. To this end, based on the various proposals herein, at least some of the following may be performed: various configuration information setting processes for transmitting/receiving wireless signals, various signal processing processes (e.g., channel encoding/decoding, modulation/demodulation, resource mapping/demapping, etc.).

In the following, we describe examples of wireless devices to which this specification applies.

Figure 19:
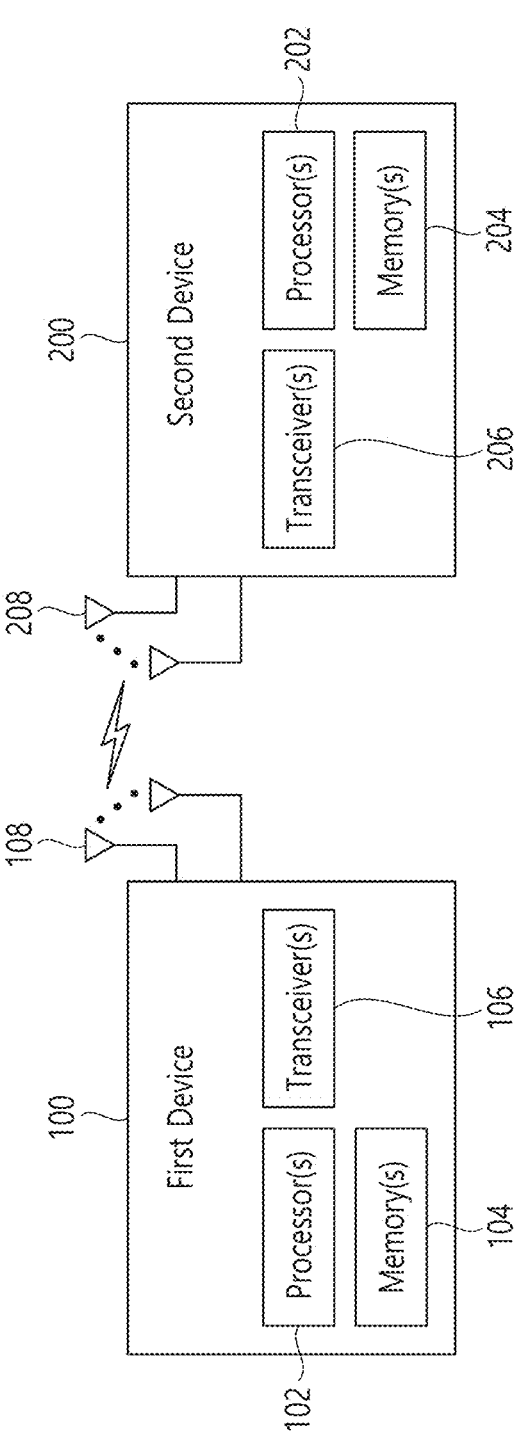
FIG. 19 illustrates a wireless device that may be applied to the present specification.

FIG. 19 illustrates a wireless device applicable to the present specification.

Referring to FIG. 19, the first wireless device 100 and the second wireless device 200 may transmit and receive wireless signals through various wireless access technologies (e.g., LTE, NR). Here, {first wireless device 100, second wireless device 200} may correspond to {wireless device 100x, base station 200} and/or {wireless device 100x, wireless device 100x} of FIG. 18.

The first wireless device 100 may include one or more processors 102 and one or more memories 104 and additionally further include one or more transceivers 106 and/or one or more antennas 108. The processor 102 controls the memory 104 and/or the transceiver 106 and may be configured to implement the descriptions, features, procedures, suggestions, methods, and/or flowcharts of operation disclosed herein. For example, the processors 102 may process information within the memory 104 to generate first information/signals and then transmit radio signals including the first information/signals through the transceivers 106. In addition, the processor 102 may receive radio signals including second information/signals through the transceiver 106 and then store information obtained by processing the second information/signals in the memory 104. The memory 104 may be connected to the processor 102 and may store a variety of information related to operations of the processor 102. For example, the memory 104 may store software code that includes instructions for performing some or all of the processes controlled by the processor 102, or for performing the descriptions, features, procedures, suggestions, methods, and/or flowcharts of operations disclosed herein. Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. The transceiver 106 may include a transmitter and/or a receiver. The transceiver 106 may be interchangeably used with a radio frequency (RF) unit. In the present specification, the wireless device may represent a communication modem/circuit/chip. The first wireless device may be, for example, a UE.

The second wireless device 200 may include one or more processors 202 and one or more memories 204 and additionally further include one or more transceivers 206 and/or one or more antennas 208. The processor 202 controls the memory 204 and/or the transceiver 206 and may be configured to implement the descriptions, features, procedures, suggestions, methods, and/or flowcharts of operation disclosed herein. For example, the processor 202 may process information within the memory 204 to generate third information/signals and then transmit radio signals including the third information/signals through the transceiver 206. In addition, the processor 202 may receive radio signals including fourth information/signals through the transceiver 106 and then store information obtained by processing the fourth information/signals in the memory 204. The memory 204 may be connected to the processor 202 and may store a variety of information related to operations of the processor 202. For example, the memory 204 may store software code that includes instructions for performing some or all of the processes controlled by the processor 202, or for performing any of the descriptions, features, procedures, suggestions, methods, and/or flowcharts of operations disclosed herein. Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. The transceiver 206 may include a transmitter and/or a receiver. The transceiver 206 may be interchangeably used with an RF unit. In the present specification, the wireless device may represent a communication modem/circuit/chip.

The second wireless device may be, for example, a base station. The base station transmits configuration information for the first beam and the second beam to the UE, and receives from the UE at least one of beam mismatch information generated by measuring the first beam and the second beam, and beam switching information based on the beam mismatch information. In this case, the first beam and the second beam are beams satisfying predetermined conditions, and the beam mismatch information may be an indication of a degree of mismatch of the first beam relative to a matching position of the first beam, based on a first received intensity and a first phase value of the first beam and a second received intensity and a second phase value of the second beam.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102, 202 may generate one or more Protocol Data Units (PDUs) and/or one or more Service Data Units (SDUs) in accordance with the descriptions, features, procedures, suggestions, methods, and/or flowcharts of operation disclosed herein. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102, 202 may receive signals (e.g., baseband signals) from the one or more transceivers 106, 206 and may obtain PDUs, SDUs, messages, control information, data, or information in accordance with the descriptions, features, procedures, suggestions, methods, and/or flowcharts of operation disclosed herein.

The one or more processors 102 and 202 may be referred to as controllers, microcontrollers, microprocessors, or microcomputers. The one or more processors 102 and 202 may be implemented by hardware, firmware, software, or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, features, procedures, suggestions, methods, and/or flowcharts of operations disclosed herein may be implemented using firmware or software, and the firmware or software may be implemented to include modules, procedures, features, etc. The firmware or software configured to perform the descriptions, features, procedures, suggestions, methods, and/or flowcharts of operations disclosed herein may be included in one or more processors 102, 202, or may be stored in one or more memories 104, 204 and driven by one or more processors 102, 202. The descriptions, features, procedures, suggestions, methods, and/or flowcharts of operation disclosed herein may be implemented using firmware or software in the form of code, instructions, and/or sets of instructions.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. In addition, the one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. In addition, the one or more processors 102 and 202 may perform control so that the one or more transceivers 106 and 206 may receive user data, control information, or radio signals from one or more other devices. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
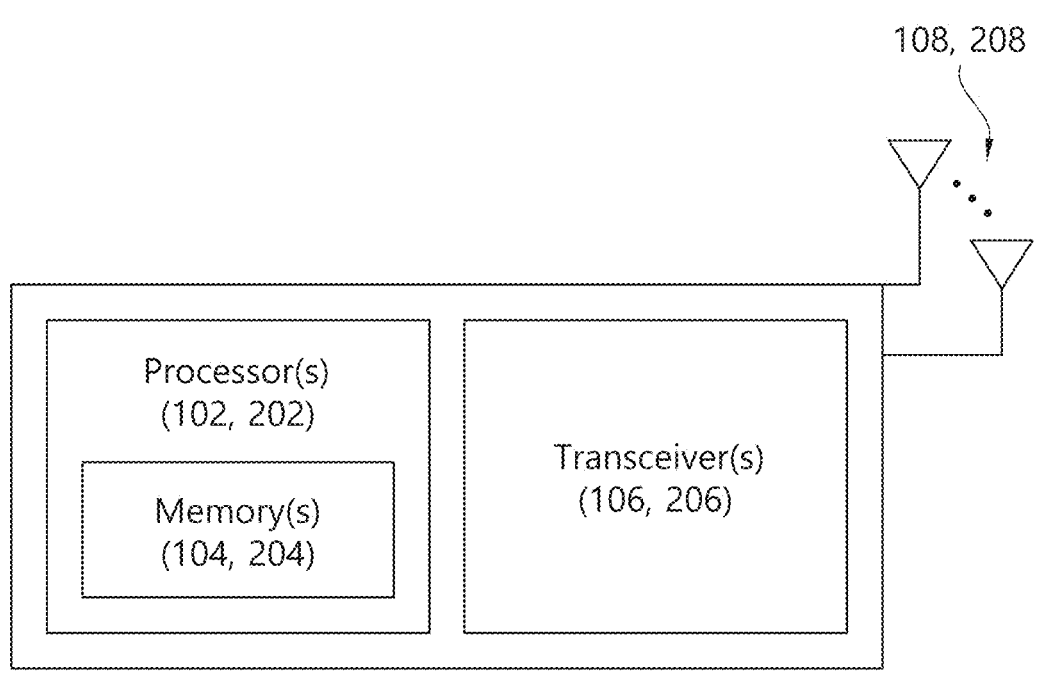
FIG. 20 illustrates another example of a wireless device that can be applied to the present specification.

FIG. 20 shows another example of a wireless device that can be applied to this specification.

Referring to FIG. 20, a wireless device may include at least one processor 102, 202, at least one memory 104, 204, at least one transceiver 106, 206, and one or more antennas 108, 208.

A difference between the wireless device example previously described in FIG. 19 and the wireless device example in FIG. 20 is that in FIG. 19, the processor 102, 202 and memory 104, 204 are separate, whereas in the example in FIG. 20, the processor 102, 202 includes memory 104, 204.

Specific descriptions of the processor 102, 202, memory 104, 204, transceiver 106, 206, and one or more antennas 108, 208 have been described previously, and to avoid unnecessary repetition of description, repetitive descriptions will be omitted.

The present disclosure may be carried out by means of at least one computer readable medium (CRM) comprising instructions based on being executed by at least one processor. The operation performed by the processor by the instruction includes: receiving configuration information for the first beam and the second beam from a network; measuring the first beam and the second beam based on the configuration information to generate beam mismatch information; and transmitting the beam mismatch information to the network. Here, the first beam and the second beam are beams satisfying predetermined conditions, and the beam mismatch information may be indicative of a degree of mismatch of the first beam relative to a matching position of the first beam, based on a first received intensity and a first phase value of the first beam and a second received intensity and a second phase value of the second beam.

The claims described herein may be combined in various ways. For example, a combination of the technical features of the method claims of this specification may be implemented as an apparatus, and a combination of the technical features of the apparatus claims of this specification may be implemented as a method. Further, a combination of technical features of the method claims of this specification and technical features of the apparatus claims of this specification may be implemented as an apparatus, and a combination of technical features of the method claims of this specification and technical features of the apparatus claims of this specification may be implemented as a method. Other implementations are within the scope of the following claims.

What is claimed is:

1. A method comprising:

receiving, by a receiver, configuration information for a first beam and a second beam from a transmitter;

measuring, by the receiver, the first beam and the second beam to generate beam mismatch information based on the configuration information; and transmitting, by the receiver, the beam mismatch information to the transmitter, wherein the first beam and the second beam are beams satisfying predetermined conditions, wherein the beam mismatch information is related to a degree of mismatch of the first beam relative to a matching position of the first beam based on a first received intensity and a first phase value of the first beam and a second received intensity and a second phase value of the second beam, and wherein the configuration information includes at least one of a direction value for each of the first beam and the second beam, a radiation pattern gain value based on the direction value, and a phase value generated based on the direction value.

2. The method of claim 1, wherein the first beam and the second beam satisfy at least one condition among a condition that the first beam maintains a same phase value within a main lobe of a beam, a condition that the second beam provides different phase values depending on an angle rotated from a reference azimuth, a condition that the reference azimuth of the second beam is determined based on the first beam, a condition that a beam gain of the second beam is a different value from a beam gain of the first beam, a condition that the second beam provides different beam gains depending on a distance angle away from the matching position of the first beam, a condition that the matching position of the first beam and a beam center of the second beam coincide with each other, and a condition that an outer angle of the second beam is greater than or equal to that of the first beam.

3. The method of claim 1, wherein the beam mismatch information comprises first angular information for a distance that the receiver is spaced from the matching position of the first beam, and second angular information for a rotation angle from a reference azimuth of the matching position to a position of the receiver.

4. The method of claim 1, wherein the first beam and the second beam include different reference signals.

5. The method of claim 1, further comprising:

transmitting beam switching information based on the beam mismatch information.

6. The method of claim 5, wherein the beam switching information is related to one beam index corresponding to the beam mismatch information among a plurality of predetermined beam indices.

7. A receiver comprising:

at least one transceiver;

at least one memory; and at least one processor operably coupled to the at least one memory and the at least one transceiver, wherein the at least one memory stores instructions that, based on being executed by the at least one processor, cause the at least one processor to perform operations comprising:

receiving, from a transmitter, configuration information for a first beam and a second beam;

measuring the first beam and the second beam to generate beam mismatch information based on the configuration information; and transmitting the beam mismatch information to the transmitter, wherein the first beam and the second beam are beams satisfying predetermined conditions, wherein the beam mismatch information is related to a degree of mismatch of the first beam relative to a matching position of the first beam based on a first received intensity and a first phase value of the first beam and a second received intensity and a second phase value of the second beam, and wherein the configuration information includes at least one of a direction value for each of the first beam and the second beam, a radiation pattern gain value based on the direction value, and a phase value generated based on the direction value.

8. The receiver of claim 7, wherein the first beam and the second beam satisfy at least one condition among a condition that the first beam maintains a same phase value within a main lobe of a beam, a condition that the second beam provides different phase values depending on an angle rotated from a reference azimuth, a condition that the reference azimuth of the second beam is determined based on the first beam, a condition that a beam gain of the second beam is a different value from a beam gain of the first beam, a condition that the second beam provides different beam gains depending on a distance angle away from the matching position of the first beam, a condition that the matching position of the first beam and a beam center of the second beam coincide with each other, and a condition that an outer angle of the second beam is greater than or equal to that of the first beam.

9. The receiver of claim 7, wherein the beam mismatch information comprises first angular information for a distance that the receiver is spaced from the matching position of the first beam, and second angular information for a rotation angle from a reference azimuth of the matching position to a position of the receiver.

10. The receiver of claim 7, wherein the first beam and the second beam include different reference signals.

11. The receiver of claim 7, further comprising:

transmitting beam switching information based on the beam mismatch information.

12. The receiver of claim 7, wherein the beam switching information is related to one beam index corresponding to the beam mismatch information among a plurality of predetermined beam indices.

13. A method comprising:

transmitting, by a transmitter, configuration information for a first beam and a second beam to a receiver; and receiving, by the transmitter, at least one of beam mismatch information generated by measuring the first beam and the second beam and beam switching information based on the beam mismatch information from the receiver, wherein the first beam and the second beam are beams satisfying predetermined conditions, wherein the beam mismatch information is related to a degree of mismatch of the first beam relative to a matching position of the first beam based on a first received intensity and a first phase value of the first beam and a second received intensity and a second phase value of the second beam, and wherein the configuration information includes at least one of a direction value for each of the first beam and the second beam, a radiation pattern gain value based on the direction value, and a phase value generated based on the direction value.

* * * * *